(12) United States Patent
Shiotani et al.

(10) Patent No.: US 7,152,824 B2
(45) Date of Patent: Dec. 26, 2006

(54) SEAT BELT RETRACTOR AND SEAT BELT DEVICE EQUIPPED WITH THE SAME

(75) Inventors: Masahiro Shiotani, Shiga (JP); Tetsuya Hamaue, Hikone (JP); Koji Hiramatsu, Shiga (JP)

(73) Assignee: Takata Corporation, Tokyo (JP)

( * ) Notice: Subject to any disclaimer, the term of this patent is extended or adjusted under 35 U.S.C. 154(b) by 208 days.

(21) Appl. No.: 10/815,935

(22) Filed: Apr. 2, 2004

(65) Prior Publication Data

US 2004/0206844 A1    Oct. 21, 2004

(30) Foreign Application Priority Data

Apr. 15, 2003  (JP) ............................. 2003-110068
Jul. 31, 2003  (JP) ............................. 2003-283373
Dec. 12, 2003  (JP) ............................. 2003-414607

(51) Int. Cl.
*B65H 75/48*  (2006.01)
(52) U.S. Cl. .................. 242/379.1; 280/805
(58) Field of Classification Search .......... 242/379.1; 280/805; 297/471, 472
See application file for complete search history.

(56) References Cited

U.S. PATENT DOCUMENTS

| | | | |
|---|---|---|---|
| 5,779,176 A | 7/1998 | Hori et al. | |
| 6,216,972 B1 | 4/2001 | Röhrle | |
| 6,568,621 B1 | 5/2003 | Hiramatsu et al. | |
| 2001/0008262 A1 | 7/2001 | Huber | |
| 2002/0066817 A1 | 6/2002 | Clute et al. | |
| 2003/0192978 A1 | 10/2003 | Palliser et al. | |

FOREIGN PATENT DOCUMENTS

| | | |
|---|---|---|
| EP | 1 024 064 | 8/2000 |
| EP | 1 180 457 | 2/2002 |
| GB | 1 335 807 | 10/1973 |
| JP | 9-202211 | 8/1997 |
| JP | 2002-53007 | 2/2002 |
| JP | 2003-19945 | 1/2003 |
| JP | 2004-231019 | 8/2004 |

*Primary Examiner*—John Q. Nguyen
(74) *Attorney, Agent, or Firm*—Manabu Kanesaka

(57) ABSTRACT

A seat belt retractor includes a spool for winding a seat belt; a locking mechanism having a locking member rotating with the spool in a normal state and being locked not to rotate in a direction of unwinding the seat belt in an emergency state; and an energy absorbing mechanism provided between the spool and the locking member for absorbing impact energy applied on an occupant when the spool rotates in the direction of unwinding the seat belt relative to the locking member in the emergency state. The energy absorbing mechanism includes an energy absorbing member provided in one of the spool and the locking member, and a deforming device provided in the other of the spool and the locking member for deforming the energy absorbing member. The energy absorbing member has a width partially varied.

14 Claims, 16 Drawing Sheets

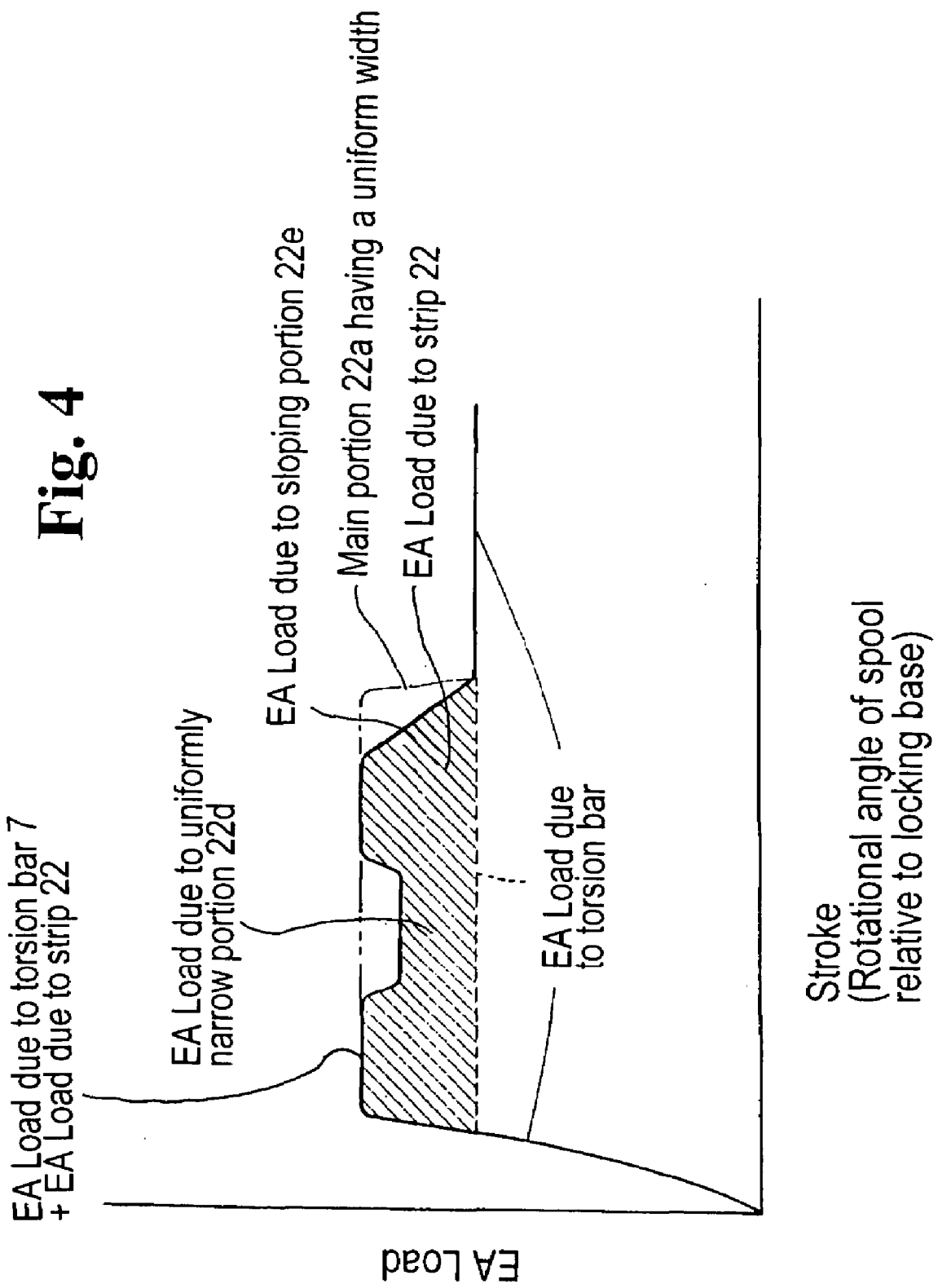

SEAT BELT RETRACTOR AND SEAT BELT DEVICE EQUIPPED WITH THE SAME

BACKGROUND OF THE INVENTION AND RELATED ART STATEMENT

The present invention relates to a seat belt retractor for retracting a seat belt so that the seat belt can be withdrawn, and a seat belt device equipped with the seat belt retractor. More specifically, the present invention relates to a seat belt retractor including an energy absorbing mechanism (hereinafter referred to as EA mechanism) for absorbing an impact energy of the seat belt on an occupant moving due to inertia in case of emergency such as a collision, in which a vehicle is significantly decelerated, and a seat belt device equipped with the seat belt retractor.

A conventional seat belt device is installed in a vehicle such as an automobile, and includes at least a seat belt retractor for retracting a seat belt, a seat belt capable of being withdrawn from the seat belt retractor and having an end connected to an auto body, a buckle fixed to the auto body, and a tongue slidably fitted to the seat belt and capable of engaging the buckle.

When the seat belt is not used, the seat belt is wound on a spool of the seat belt retractor. After an occupant is seated, the occupant withdraws the seat belt from the seat belt retractor for a predetermined length and engages the tongue with the buckle to wear the seat belt. When the occupant wears the seat belt, a portion of the seat belt between the tongue and the seat belt retractor is placed over a shoulder and chest as a shoulder belt, and a portion of the seat belt between the tongue and a connection with the auto body is placed round a waist as a lap belt.

In this state, in case of emergency, a locking mechanism is activated to lock the spool from rotating in an unwinding direction, thereby preventing the seat belt from being withdrawn. Accordingly, in the seat belt device, the shoulder belt restrains the shoulder and chest of the occupant, and the lap belt restrains the waist of the occupant, so that the occupant is not thrown forward for protection.

In such a seat belt retractor of the conventional seat belt device, when the seat belt restrains the occupant to protect the occupant in case of emergency such as a collision, the vehicle is significantly decelerated and the occupant is rushed forward due to large inertia. Consequently, a large load is applied on the seat belt, and the seat belt applies a large impact on the occupant. While the impact on the occupant does not cause a serious problem, it is desirable to absorb the impact energy to limit the impact force if possible.

To this end, there has been developed a seat belt retractor provided with a torsion bar for absorbing the impact energy to restrict the load applied to the seat belt in case of emergency. FIG. 16 is a vertical sectional view showing a seat belt retractor including such a torsion bar. The seat belt retractor includes a seat belt retractor 1; a U-shaped frame 2; a seat belt 3; a spool 4 rotatably supported between both sidewalls of the U-shaped frame 2 for winding the seat belt 3; deceleration sensing means 5 to be activated upon detecting a large deceleration in case of emergency; a locking mechanism 6 to be activated by the deceleration sensing means 5 for preventing the spool 4 from rotating at least in the direction of unwinding the seat belt; a torsion bar 7 inserted into the center of the spool 4 for connecting the spool 4 and the locking mechanism 6 to be rotatable; spring means 8 for constantly urging the spool 4 in the winding direction of the seat belt by the spring force of a spiral spring 9 via a bush 10; a pre-tensioner 11 to be activated in case of emergency for producing a belt winding torque; and a bush 12 for transmitting the belt winding torque from the pre-tensioner 11 to the spool 4.

The locking mechanism 6 includes a locking base 14 (corresponding to a locking member) supported on a first torque transmitting portion 17 of the torsion bar 7 to be rotatable therewith for holding a pawl 13 to be rotatable. The locking mechanism 6 further includes a locking gear 6a. The locking gear 6a rotates together with the torsion bar 7 in a normal state. In case of emergency, the locking gear 6a stops through an operation of the deceleration sensing means 5, so that a rotational difference relative to the torsion bar 7 is generated. Accordingly, the pawl 13 engages internal teeth 19 on a sidewall of the frame 2 to prevent the locking base 14, i.e. the spool 4, from rotating in the unwinding direction of the seat belt.

The torsion bar 7 is provided with a first torque transmitting portion 17 for engaging the locking base 14 so that the torsion bar 7 does not rotate relative to the locking base 14, and a second torque transmitting portion 18 for engaging the spool 4 so that the torsion bar 7 does not rotate relative to the spool 4. A relative rotation locking member 15 with a ring shape is disposed between the spool 4 and the shaft portion 14a of the locking base 14. The relative rotation locking member 15 has a female thread 15a on an inner peripheral surface thereof engaging a male thread 14c formed on the shaft portion 14a of the locking base 14. Accordingly, the relative rotation locking member 15 is screwed in an axial hole of the spool 4, so that the relative rotation locking member 15 does not rotate relative to the spool 4 and moves in an axial direction. When the spool 4 rotates in the unwinding direction of the seat belt relative to the locking base 14, the relative rotation locking member 15 rotates together with the spool 4 and moves to the right in FIG. 16.

With the spring force of the spring means 8, the spool 4 is urged constantly in the winding direction of the seat belt via the bush 10, the torsion bar 7, the second torque transmitting portion 18 of the torsion bar 7, and the bush 12. When the pre-tensioner 11 is activated, the belt winding torque produced in the pre-tensioner 11 is transmitted to the spool 4 via the bush 12, so that the spool 4 winds the seat belt for a predetermined length.

In the conventional seat belt retractor 1 with the configuration described above, when the seat belt is not used, the seat belt 3 is retracted completely with the urging force of the spring means 8. When the seat belt 3 is withdrawn in a normal speed for wearing, the spool 4 rotates in the unwinding direction of the seat belt, and the seat belt 3 is withdrawn smoothly. After a tongue (not shown) slidably fitted to the seat belt 3 is inserted into and engages a buckle (not shown), an excess portion of the seat belt 3 is wound on the spool 4 with the urging force of the spring means 8, so that the seat belt 3 is fitted to the occupant without inflicting a pressure.

In case of emergency, the belt winding torque produced by the pre-tensioner 11 is transmitted to the spool 4. The spool 4 quickly winds the seat belt 3 for a predetermined length to protect the occupant. At the same time, the deceleration sensing means 5 is activated by the large deceleration in the emergency, and the locking mechanism 6 is activated. By the operation of the deceleration sensing means 5, the lock gear 6a is prevented from rotating in the unwinding direction of the seat belt, and the pawl 13 of the locking mechanism 6 rotates and engages the internal teeth 19 on the sidewall of the frame 2. Accordingly, the locking base 14 is prevented from rotating in the unwinding direction of the seat belt, so that the torsion bar 7 is twisted and the spool 4 alone rotates in the unwinding direction of the seat belt relative to the locking base 14.

After that, the spool 4 rotates and the torsion bar 7 twists in the unwinding direction of the seat belt, thereby absorbing the impact energy on the occupant and restricting the load applied to the seat belt 3. The torsion bar 7 constitutes the EA mechanism, and the EA mechanism generates a counter load (hereinafter referred to as EA load) as shown in FIG. 4. The EA load generated by the torsion bar 7 increases gradually as a rotational stroke (degree) of the spool 4 relative to the locking base 14 increases, and then becomes a constant value.

When the spool 4 rotates in the unwinding direction of the seat belt relative to the locking base 14, the relative rotation locking member 15 moves axially in the right direction in FIG. 16. When the relative rotation locking member 15 reaches an end of the male thread, the relative rotation locking member 15 stops moving further to the right and is locked. The relative rotation locking member 15 stops the rotation relative to the locking base 14. The relative rotation locking member 15 may contact a side surface of a flange 14*b* of the locking base 14 to stop moving further to the right.

Accordingly, the spool 4 stops rotating relative to the locking base 14. That is, the rotation of the spool 4 in the unwinding direction of the seat belt is locked, and the seat belt 3 is prevented from being withdrawn. As a result, the seat belt 3 prevents the movement of the occupant caused by inertia, and protects the occupant.

In the seat belt retractor 1, when the seat belt is withdrawn suddenly, the locking base 14 of the locking mechanism 6 rotates in the unwinding direction of the seat belt relative to the locking gear 6*a*. The pawl 13 of the locking mechanism 6 engages the inner teeth 19 on the sidewall of the frame 2 to stop the locking base 14. Accordingly, the spool 4 is prevented from rotating in the unwinding direction via the torsion bar 7, so that the seat belt is not withdrawn.

In the seat belt retractor 1, only the torsion bar 7 generates the EA load to absorb the impact energy on the occupant. The EA load is set at a minimum and constant level for absorbing the impact energy so that the impact load on the occupant is made as small as possible. It is possible to absorb the impact energy on the occupant in an emergency using the torsion bar. However, it is desirable to absorb the impact energy on the occupant more effectively and properly.

For example, Japanese Patent Publication (Kokai) No. 2002-53007 has disclosed impact energy absorbing means disposed between a spool and a locking base and including a wire and an engaging pin engaging the wire. When the spool rotates relative to the locking base, the engaging pin forces the wire to deform through a rotation of the spool, thereby absorbing the impact energy.

In Japanese Patent Publication (Kokai) No. 2000-85527, a carrier is fixed to an end of a torsion rod so as to rotate together with the end. The carrier is connected to an end of band-shaped pulling means, and the band-shaped pulling means is inserted into a curved guide groove formed in a housing. When the carrier rotates relative to the housing, the guide groove forces the pulling means to deform through the rotation of the carrier, thereby absorbing the impact energy.

Japanese Patent No. 2875505 has disclosed another technique for absorbing the impact energy on the occupant. In the technique, just after a seat belt is locked, a predetermined resistance against unwinding is applied on a webbing to maintain a predetermined tension load of the webbing. The webbing is unwound for a predetermined length while maintaining the tension load, thereby absorbing the impact energy on the occupant.

In the technique disclosed in Japanese Patent No. 2875505, a shaft is disposed rotatably inside the spool winding the webbing. A locking mechanism is provided for locking the shaft so that the webbing is not unwound, and an energy absorbing member (EA plate) capable of deforming plastically is disposed between the spool and the shaft. In case of emergency, when the locking mechanism locks the shaft not to rotate, the webbing restrains the occupant moving forward due to inertia, and the webbing is pulled to rotate the spool relative to the shaft in the unwinding direction of the webbing. When the relative rotational force exceeds a certain value, the EA plate deforms plastically and wound around the shaft in the unwinding direction of the webbing, thereby absorbing the impact energy through the plastic deformation. Accordingly, in a state that the locking mechanism locks the spool, the spool still rotates and the webbing is unwound with a certain tension, thereby reducing the force between the webbing and the occupant.

In the energy absorbing means disclosed in Japanese Patent Publication (Kokai) No. 2002-53007, it is necessary that the wire engages all of three engaging pins while winding. Further, while the wire engages the three engaging pins, an end of the wire needs to be inserted into a hole formed in the locking base. Accordingly, the energy absorbing means has a complex structure and takes a lot of time and labor to assemble. Furthermore, in order to stably obtain a desired energy absorbing effect, it is necessary to provide the three engaging pins at predetermined places on the spool, thereby making the energy absorbing means expensive.

In the energy absorbing means disclosed in Japanese Patent Publication (Kokai) No. 2000-85527, the cylindrical portion deforms plastically toward inside for absorbing the impact energy. However, it is difficult to deform the cylindrical portion plastically toward the inside evenly, so that it is difficult to stably obtain the desired energy absorbing effect. In addition, the energy absorbing means is composed of the cylindrical portion and a flange portion, and it is necessary to form a cut-off portion in the cylindrical portion. Accordingly the energy absorbing means has a complex structure and difficult to make, thereby increasing cost. In addition, the cylindrical portion makes the retractor large in an axial direction.

Generally, a vehicle generates a different impact upon collision depending on a structure thereof. Therefore, in order to protect the occupant sufficiently, according to a structure of the vehicle, it is necessary to optimize the energy absorption characteristic such as a load for activating the energy absorption mechanism to operate (energy absorption load: tension of the webbing when the energy absorption starts) and an amount of deformation upon the impact absorption (length of the unwound webbing). Consequently, in an entire structure of the retractor, it is required to optimize and design the energy absorption characteristic flexibly and freely.

In the technique disclosed in Japanese Patent No. 2875505, it is not considered to adjust the EA plate to optimize the impact energy, and no structure and technique have been disclosed. Accordingly, it is difficult to optimize the energy absorption characteristic.

In view of the problems described above, the present invention has been made, and an object of the present invention is to provide a seat belt retractor with a simple structure and low cost, and it is possible to adjust the EA load through deformation of an energy absorbing member.

It is another object of the present invention to provide a seat belt device provided with a seat belt retractor for effectively absorbing the impact energy on the occupant, and for restraining and protecting the occupant appropriately in case of emergency.

It is a further object of the present invention to provide a seat belt retractor capable of optimizing the energy absorption characteristic easily.

Further objects and advantages of the invention will be apparent from the following description of the invention.

SUMMARY OF THE INVENTION

To achieve the objects described above, according to a first aspect of the present invention, a seat belt retractor includes a spool for winding a seat belt; a locking mechanism having a locking member rotating with the spool during in a normal state and being locked not to rotate in a direction of unwinding the seat belt in an emergency state; and an energy absorbing mechanism provided between the spool and the locking member for absorbing impact energy on an occupant when the spool rotates in the direction of unwinding the seat belt relative to the locking member in the emergency state. The energy absorbing mechanism includes a strip energy absorbing member provided in one of the spool and the locking member, and deforming means provided in the other of the spool and the locking member for deforming the energy absorbing member. The strip energy absorbing member has a width partially varied. In the emergency state, the locking member is locked not to rotate in the direction of unwinding the seat belt. When the spool rotates in the direction of unwinding the seat belt relative to the locking member, the deforming means deforms the energy absorbing member rotating with the spool, thereby restricting a load applied to the seat belt and absorbing the impact energy. It is possible to change an amount of the absorbed impact energy during the process of absorbing the impact energy.

According to a second aspect of the present invention, the deforming means is an arc groove for forcing the strip energy absorbing member to deform.

According to a third aspect of the present invention, the spool and the locking member are connected with a torsion bar. The torsion bar twists when the spool rotates relative to the locking member.

In the first to third aspects, the EA load due to the deformation of the energy absorbing member is variable according to the width of the energy absorbing member. Accordingly, it is possible to adjust the EA load according to, for example, a type of automobile, so that the impact energy on the occupant is absorbed effectively and appropriately. The energy absorbing member is formed in the strip plate, so that the energy absorbing member deforms continuously. Accordingly, it is possible to stably obtain the energy absorbing effect of the energy absorbing member with a simple structure, thereby making it easy to assemble and reducing cost. Especially, in the third aspect of the invention, it is possible to obtain a large EA load due to the deformation of the torsion bar and the energy absorbing member, and a small EA load due to the deformation of only the torsion bar. Therefore, it is possible to flexibly adjust the EA load, thereby absorbing the impact energy on the occupant effectively and appropriately.

According to a fourth aspect of the present invention, a seat belt retractor includes a cylinder member with a substantially cylindrical shape rotatable for winding a seat belt; a shaft member provided inside the cylinder member and having one end connected to the cylinder member to be rotatable therewith; a plate fitting member disposed inside an end portion of the cylinder member and connected to the other end of the shaft member to be rotatable therewith; a locking mechanism for being locked not to rotate in a direction of unwinding the seat belt; and a plate member capable of deforming plastically and having one end fixed to a periphery of the plate fitting member and the other end engaging an inner surface of the end portion of the cylinder member.

According to a fifth aspect of the present invention, a seat belt retractor includes a cylinder member rotatable for winding a seat belt; a shaft member provided inside the cylinder member to be rotatable relative thereto; a locking mechanism for locking the shaft member not to rotate in a direction of unwinding the seat belt; and a plate member capable of deforming plastically through rotational force transmitted when the cylinder member rotates relative to the shaft. One end of the shaft member is connected to the cylinder member so that the shaft member can rotate therewith, twist and deform. The plate fitting member is connected to the other end of the shaft member so as to rotate together therewith at an inside of an end portion of the cylinder member. One end of the plate member is fixed to a periphery of the plate fitting member, and the other end of the plate member engages an inner surface of the cylinder member.

In the fourth and fifth aspects of the present invention, the shaft member capable of twisting and deforming is disposed inside the cylinder member for winding the seat belt, and the plate member capable of deforming plastically is disposed between an external surface of the plate fitting member connected to the shaft member to be rotatable therewith and the inner surface of the cylinder member.

In an emergency state, when the plate fitting member is prevented from rotating in the direction of unwinding the seat belt, the seat belt (webbing) restrains the occupant moving forward due to inertia, and the seat belt pulls the cylinder member to rotate relative to the shaft member in the direction of unwinding the webbing. In the fourth and fifth aspects, the shaft member can be twisted and deformed. Accordingly, when the cylinder member rotates relative to the shaft member by a fixed angle, the shaft member deforms plastically by the twist force due to the relative rotation, thereby absorbing the impact energy through the plastic deformation. With this movement, the plate member provided between the plate fitting member and the cylinder member deforms plastically and wound around, for example, the plate fitting member in the direction of unwinding the webbing, thereby further absorbing the impact energy through the plastic deformation.

Accordingly, in the fourth and fifth aspects, both the shaft member and the plate member deform plastically as the EA mechanism. The EA mechanism absorbs a load for deforming the shaft member and the plate member twining around the plate fitting member as a total energy absorption (EA) load.

In the fourth and fifth aspects, it is possible to optimize an amount of the EA load and a range of energy absorption by selecting a material and thickness of the shaft member. It is also easy to optimize an amount of the EA load and a range of energy absorption of the plate member. That is, when a radial thickness of a ring space formed between the plate fitting member and the cylinder member increases (decreases), the load increases (or decreases). When the thickness of the plate member increases, the load increases (or decreases). When the plate member is arranged to engage the cylinder member at a different position in the circumferential direction, it is possible to change the relative rotation stroke characteristic of twining, thereby changing the load characteristic.

Note that in the conventional structure in which the EA plate is provided between an inner surface of the spool and outer surface of the shaft, it is difficult to adjust the EA plate as described above to change the load. That is, in the conventional structure, the EA plate is directly attached to the outer surface of the shaft at middle thereof in an axial direction, and is disposed in a limited narrow space between the shaft and the spool. Accordingly, it is difficult to increase the radial thickness of the ring space between the shaft and the spool. In the fourth and fifth aspects of the present invention, one end of the plate member is attached to, not the shaft member, but the periphery of the plate fitting member provided at one end of the shaft member. The other end of the plate member engages, not the middle, but the inner surface of the cylinder member. Accordingly, it is possible to change a diameter of the plate fitting member independently of a diameter of the shaft member to optimize the radial thickness of the ring space.

In the conventional structure, the ring space is limited, and it is difficult to increase the thickness of the EA plate as described above. If a thick plate is used in the limited space, the twining with plastic deformation is difficult. On the contrary, in the fourth and fifth aspects, it is possible to adjust the radial thickness of the ring space freely, thereby making it easy to increase the thickness of the plate member.

In the conventional structure, the EA plate engages an inner surface of the spool at middle in the axial direction. Since the webbing is wound around the spool, the spool is provided with a webbing-fixing structure at middle thereof (see Japanese Patent No. 2875505). Accordingly, it is possible to arrange the EA plate to engage the spool only at a position in the circumferential direction other than the webbing-fixing structure. On the contrary, in the fourth and fifth aspects of the invention, the plate member engages the end of the cylinder member. Therefore, the position of the plate member engaging the cylinder member in the circumferential direction is not limited by the webbing-fixing structure and can be arranged freely.

As described above, in the fourth and fifth aspects of the invention, it is possible to optimize an amount of the EA load and a range of energy absorption by adjusting the radial thickness of the ring space between the plate fitting member and the cylinder member, a thickness of the plate member, and the position where the plate member engages the cylinder member. It is easier to optimize an amount of the EA load and a range of energy absorption of the plate member. Combined with the energy absorption of the shaft member and the plate member, it is possible to optimize the energy absorption characteristic of the entire retractor. Therefore, it is possible to easily optimize the energy absorption characteristic according to a difference in a structure of a vehicle for protecting the occupant sufficiently and meeting the recent needs.

According to a sixth aspect of the present invention, in the seat belt retractor of the fourth and fifth aspects, the cylinder member has a main cylinder portion for winding the seat belt and a thick cylinder portion having an outer diameter larger than that of the main cylinder portion. The plate fitting member has a substantially disk shape. One end of the plate member is attached to the periphery of the plate fitting member, and the other end of the plate member engages the inner surface of the thick cylinder portion. In this aspect, the thick cylinder portion is formed at one end of the cylinder member, and the ring space for disposing the plate member is formed between the inner surface of the thick cylinder portion and the periphery of the plate fitting member. Therefore, it is possible to reduce a diameter of the entire cylinder member to accommodate the plate fitting member and the plate member, thereby making the retractor small.

According to a seventh aspect of the present invention, in the seat belt retractor of the sixth aspect, the other end of the plate member engages the inner surface of the thick cylinder portion and separates from the thick cylinder portion at a predetermined time after the cylinder member starts to rotate relative to the plate fitting member. After the plate member separates from the thick cylinder portion at the predetermined time, the plate member no longer absorbs the collision energy. Therefore, when the shaft member has an enlarged range of energy absorption through the deformation, it is possible to arrange only the shaft member to absorb the energy after the predetermined time. Consequently, the energy absorption load and energy absorption range of the entire retractor can be designed more freely.

When the EA load decreases at the late stage as described above, the following advantage is expected. Recently, there has been a vehicle equipped with an SRS (supplemental restraint system) airbag system to be inflated for receiving and protecting the occupant in an emergency. In a vehicle equipped with the SRS, the airbag system and the seat belt device cooperate to improve the safety of the occupant. In order to obtain the effect of the airbag system efficiently and safely, at an early stage of the collision, i.e. until the occupant contacts the inflated airbag, the seat belt device is arranged to provide a large energy absorption load for restraining the occupant. At a late stage of the collision, i.e. after the airbag receives the occupant, the seat belt device decreases the energy absorption load, so that the airbag system protects the occupant. In the seventh aspect of the invention, it is possible to decrease the energy absorption load at a late stage of collision. Therefore, it is suitable for a vehicle with the SRS airbag system, so that the seat belt does not apply an excessive restraining force to the occupant at a late stage of collision.

According to an eighth aspect of the present invention, in the seat belt retractor of the sixth aspect, the plate fitting member with a disk shape has a thin portion having a radius smaller than that of the other portion for winding the plate member, so that a distance between the plate member and the thick cylinder portion increases. In the eighth aspect of the invention, when the plate member twines around the thin portion of the plate fitting member, the distance between the plate member and the thick cylinder portion increases, thereby decreasing the energy absorption load.

According to a ninth aspect of the present invention, in the seat belt retractor of the sixth aspect, the plate member has a narrow portion having a width smaller than that of the other portion at the other end thereof. The plate member sequentially deforms plastically from one end thereof and twines around the plate fitting member. The narrow portion of the plate member has strength smaller than that of the other portion. Accordingly, the narrow portion deforms plastically with a smaller load at the last stage, thereby decreasing the energy absorption load.

According to a tenth aspect of the present invention, in the seat belt retractor of one of the sixth to ninth aspects, the thick cylinder portion of the cylinder member has a projection projecting inwardly in a radial direction. The plate member has the other end thereof abutting against the projection, so that the plate member deforms plastically when the plate fitting member rotates relative to the cylinder member.

According to an eleventh aspect of the present invention, in the seat belt retractor of the tenth aspect, the projection has a contact end surface on a side surface thereof at a one side in the circumferential direction. The plate member is disposed so that the other end thereof abuts against the contact end surface. Accordingly, the other end of the plate member is pressed against the contact end surface of the projection, so that the plate member deforms plastically when the plate fitting member rotates relative to the cylinder member.

According to a twelfth aspect of the present invention, in the seat belt retractor of the eleventh aspect, the projection has the contact end surface on the side surface thereof in a rotational direction of the cylinder member relative to the plate fitting member. The plate member is arranged such that the other end thereof abuts against the contact end surface to be pressed in the direction of the relative rotation until a predetermined time after the cylinder member starts to rotate relative to the plate fitting member, and the other end thereof separates from the contact end surface after the predetermined time. The other end of the plate member abuts against the contact end surface of the projection formed on the side in the direction of relative rotation of the plate fitting member inside the thick cylinder portion. The plate member is pressed by the contact end surface of the projection in the direction of the relative rotation, and deforms plastically when the plate fitting member rotates relative to the cylinder member. After the predetermined time, the other end of the plate member separates from the contact end surface of the projection, and the plate member does not absorb the collision energy.

According to a thirteenth aspect of the present invention, a seat belt device includes a seat belt retractor of one of the aspects described above, a seat belt to be withdrawn from the seat belt retractor and having an end to an auto body, a buckle fixed to the auto body, and a tongue slidably fitted to the seat belt and capable of engaging the buckle.

The seat belt device is equipped with the seat belt retractor of one of the aspects described above, thereby absorbing the impact energy on the occupant effectively, and restraining and protecting the occupant appropriately.

BRIEF DESCRIPTION OF THE DRAWINGS

FIGS. 1(a) and 1(b) are views showing a seat belt retractor according to an embodiment of the present invention, wherein FIG. 1(a) is a sectional view showing a spool, a torsion bar, and a locking base, and FIG. 1(b) is a sectional view showing an energy absorbing mechanism included in the seat belt retractor and taken along line 1(b)—1(b) in FIG. 1(a);

FIG. 4 is a graph showing a characteristic of energy absorbing (EA) load;

FIGS. 5(a) and 5(b) are views showing a seat belt retractor according to another embodiment of the present invention; wherein FIG. 5(a) is a sectional view similar to FIG. 1(b) and FIG. 5(b) is a perspective view of a strip;

DETAILED DESCRIPTION OF PREFERRED EMBODIMENTS

Figure 1A:
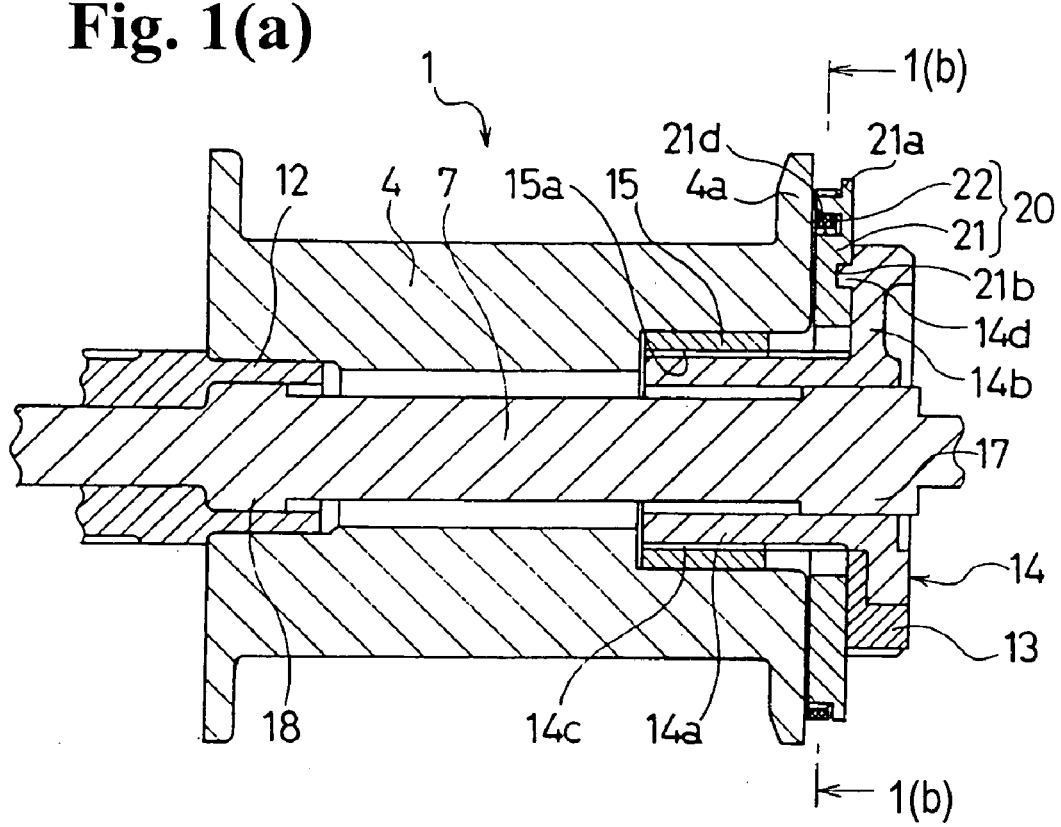
Figure 1B:
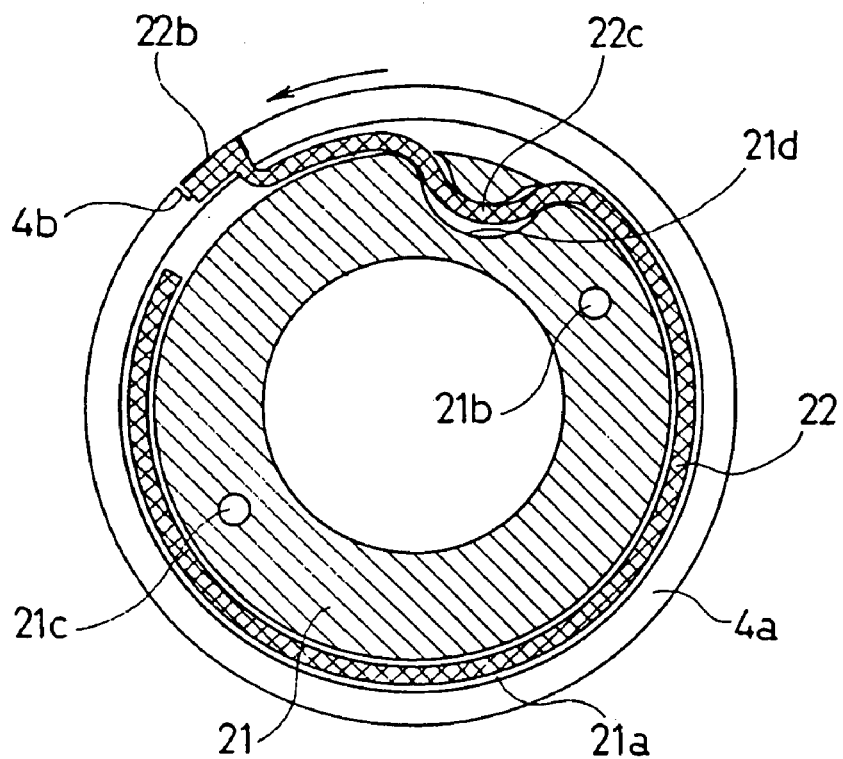
Figure 2:
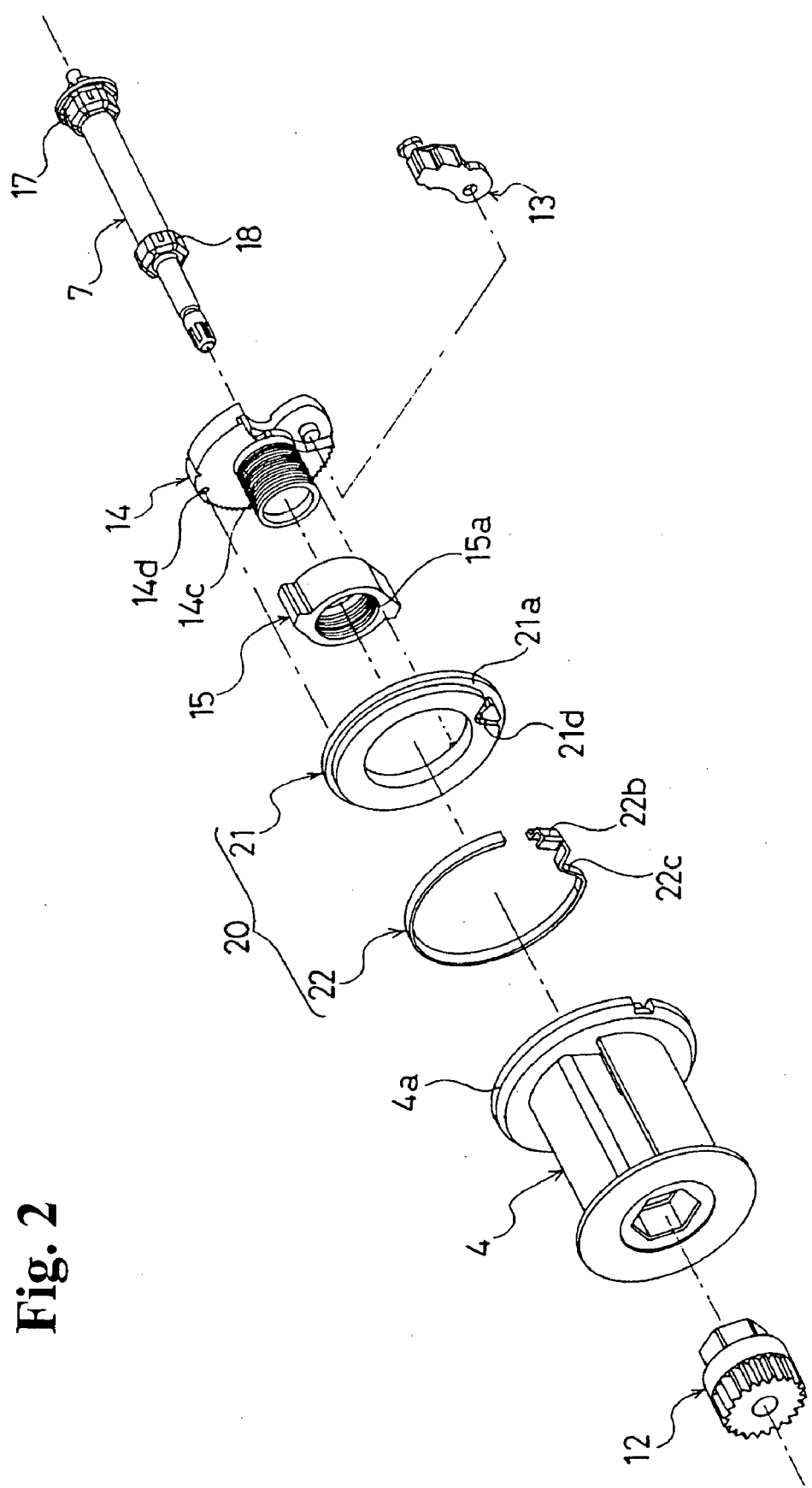
FIG. 2 is an exploded perspective view of the seat belt retractor shown in FIG. 1(a)

Hereunder, embodiments of the present invention will be described with reference to the accompanying drawings. FIGS. 1(a) and 1(b) are views showing a seat belt retractor according to an embodiment of the present invention, wherein FIG. 1(a) is a sectional view showing a spool, a torsion bar, and a locking base, and FIG. 1(b) is a sectional view showing an energy absorbing mechanism included in the seat belt retractor and taken along line 1(b)—1(b) in FIG. 1(a). FIG. 2 is an exploded perspective view of the seat belt retractor shown in FIG. 1(a). Incidentally, in the following description of the present invention, the same reference numerals designate the same components as those of a conventional seat belt retractor shown in FIG. 16, so that the descriptions thereof are omitted. In the seat belt retractor of the embodiment, components not shown in FIG. 1(a) are the same as those of the conventional seat belt retractor shown in FIG. 16.

Figure 16:
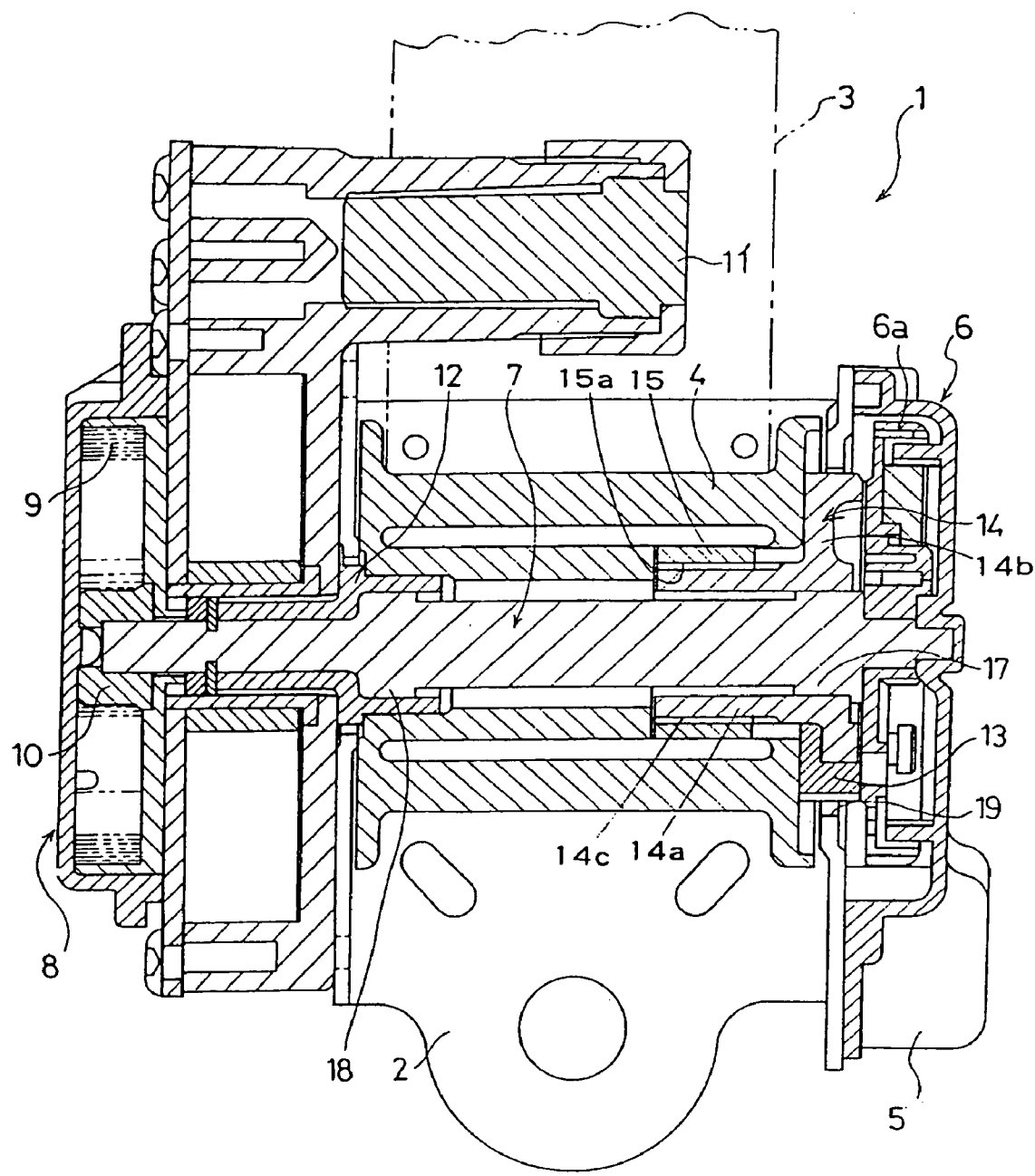
FIG. 16 is a sectional view of a conventional seat belt retractor having a torsion bar.

As shown in FIGS. 1(a), 1(b), and 2, a seat belt retractor 1 includes a torsion bar 7 as in the conventional seat belt retractor shown in FIG. 16, and an energy absorbing mechanism 20 provided between a spool 4 and a locking base 14. The energy absorbing mechanism 20 is energy absorbing means for restricting load applied to the seat belt in an emergency and for absorbing impact energy applied to an occupant. The energy absorbing mechanism 20 includes a ring guide plate 21 and a strip 22 for absorbing energy. The guide plate 21 is disposed between a right side of the spool 4 and a left side of the flange 14b of the locking base 14. The strip 22 is formed of a long plate such as a stainless steel plate and has a substantially ring shape.

The guide plate 21 has a flange 21a around a periphery thereof and a predetermined number of engaging recesses 21b and 21c (two in FIG. 1(a)) at one side thereof facing the flange 14b. The guide plate 21 also has a substantially arc guide groove 21d for guiding the strip 22 at the other side thereof facing the spool 4. The guide groove 21d has a width larger than a thickness of the strip 22. The flange 14b of the locking base 14 has two engaging projections 14d (shown only one in FIG. 1(a)) at a side thereof facing the guide plate 21. The engaging projections 14d correspond to the engaging recesses 21b and 21c and can be fitted into the engaging recesses 21b and 21c, so that the locking base 14 can be attached to the guide plate 21. As shown in FIG. 1(a), the engaging projections 14d are fitted into the recesses 21b and 21c, and the locking base 14 is fixed to the guide plate 21 so as to rotate together with the locking base 14.

Figure 3:
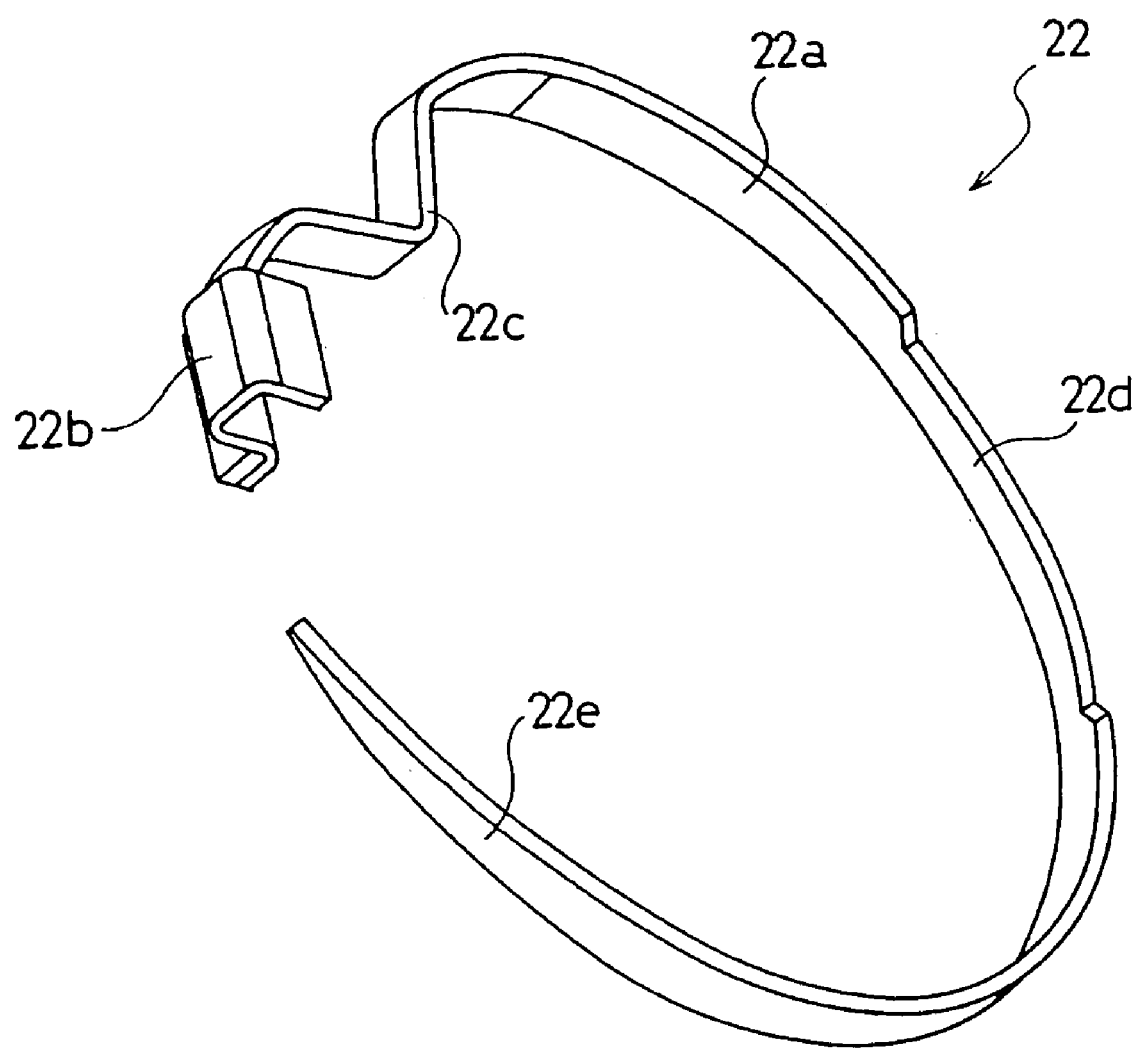
FIG. 3 is a perspective view of a strip.

As shown in FIG. 1(b), the spool 4 has an engaging notch 4b on a rim of the right flange 4a. As shown in FIG. 3, a main portion 22a of the strip 22 has a uniform width. The strip 22 has a U-shaped engaging portion 22b at one end thereof, so that the engaging portion 22b engages the engaging notch 4b of the spool 4. When the spool 4 rotates in the direction of unwinding the seat belt, the engaging portion 22b rotates together with the spool 4 in the same direction.

The strip 22 has an initially deformed portion 22c between the engaging portion 22b and the main portion 22a. As shown in FIG. 1(b), the initially deformed portion 22c is a shape for fitting in the guide groove 21d. The strip 22 has a uniformly narrow portion 22d with a uniform width smaller than that of the main portion 22a between the initially deformed portion 22c and an end thereof opposite to the engaging portion 22a. The strip 22 has a sloping portion 22e with a width smaller than that of the main portion 22a and decreasing linearly or nonlinearly (linearly in FIG. 3) toward the end of the strip 22 opposite to the engaging portion 22b.

After the guide plate 21 is attached to the locking base 14, the initially deformed portion 22c of the strip 22 is fitted into the guide groove 21d as shown in FIG. 1(b), so that the strip 22 is fitted to the guide plate 21. After the locking base 14 is attached to the spool 4, the engaging portion 22b engages the engaging notch 4b of the spool 4. Accordingly, the spool 4, the locking base 14, the guide plate 21, and the strip 22 are assembled. In this state, as shown in FIGS. 1(a) and 1(b), the strip 22 except the engaging portion 22b and the initially deformed portion 22c fitted in the guide groove 21d is wound around a main body (except the flange 21a) of the guide plate 21. The flange 21a prevents the strip 22 from moving toward the locking base 14 to come off the main body of the guide plate 21.

The seat belt retractor 1 is to be installed in a seat belt device (not shown). As in the conventional seat belt device, the seat belt device includes at least a seat belt to be withdrawn from the seat belt retractor and having an end connected to the auto body, a buckle fixed to the auto body, and a tongue slidably fitted to the seat belt and capable of engaging the buckle.

In the seat belt retractor 1 of the embodiment, the tongue of the seat belt device engages the buckle and the occupant wears the seat belt. In case of emergency, the occupant pulls the seat belt due to inertia, and the spool 4 and locking base 14 both start to rotate in the direction of unwinding the seat belt due to a load from the seat belt. Then, the locking mechanism 6 is activated to immediately lock the locking base 14, thereby preventing the locking base 14 from rotating in the direction of unwinding the seat belt. The force in the direction of unwinding the seat belt is applied to the spool 4 from the seat belt 3. The spool 4 starts to rotate in the direction of unwinding the seat belt relative to the locking base 14. The torsion bar 7 is twisted as in the conventional retractor shown in FIG. 16. The spool 4 and the relative rotation locking member 15 rotate relative to the locking base 14 in the direction of unwinding the seat belt.

When the relative rotation locking member 15 rotates relative to the locking base 14, the relative rotation locking member 15 moves toward the flange 14b or right in an axial direction in FIG. 1(a). The torsion bar 7 twists and deforms to absorb impact energy, and the EA load is generated, thereby reducing the load applied to the seat belt 3.

At the same time, the spool 4 rotates in the direction of unwinding the seat belt, and the engaging portion 22b rotates in the same direction. Due to the rotation of the spool 4, the strip 22 is pulled in the same direction via the engaging portion 22b. The initially deformed portion 22c moves in a direction away from the guide groove 21d, and is pressed against the guide groove 21d. The initially deformed portion 22c deforms with the guide groove 21d to generate deformation resistance (bending resistance) and sliding resistance therebetween, thereby absorbing the impact energy and generating the EA load to reduce the load applied to the seat belt 3. After the initially deformed portion 22c passes through the guide groove 21d, the main portion 22a (the side opposite from the engaging portion 22b) enters and passes through the guide groove 21d, so that the strip 22 deforms continuously.

Next, the uniformly narrow portion 22d enters and passes through the guide groove 21d. The uniformly narrow portion 22d is continuously forced to deform. Since the uniformly narrow portion 22d has the width narrower than that of the main portion 22a, the bending resistance and sliding resistance are smaller, so that the EA load is smaller than that when the main portion 22a passes through the guide groove 21d.

When the main portion 22a enters and passes through the guide groove 21d to generate the EA load, an amount of the EA load returns to the former amount. Finally, the sloping portion 22e enters and passes through the guide groove 21d. At this time, the sloping portion 22e is continuously forced to deform. Since the sloping portion 22e has a width continuously decreasing, the bending resistance and sliding resistance continuously decrease, so that the EA load continuously decreases. When the sloping portion 22e has a width linearly decreasing, the EA load continuously linearly decreases. When the sloping portion 22e has a width nonlinearly decreasing, the EA load nonlinearly decreases. Accordingly, due to the deformation of the strip 22, the EA load is generated as the load applied to the seat belt 3, thereby further absorbing the impact energy.

After the locking base 14 is locked and the spool 4 rotates almost 360 degrees relative to the locking base 14, the strip 22 completely passes through the guide groove 21d. Accordingly, the strip 22 no longer deforms to absorb the impact energy, and only the torsion bar 7 deforms to generate the EA load for absorbing the impact energy. The EA load due to the deformation of the strip 22 is as shown in FIG. 4.

When the relative rotation locking member 15 stops moving to the right in the axial direction, the relative rotation locking member 15 is locked and the spool 4 is locked not to rotate relative to the locking base 14. That is, the spool 4 is prevented from rotating in the direction of unwinding the seat belt, and the seat belt 3 is prevented from being withdrawn, so that the seat belt 3 restrains the occupant not to move due to inertia.

As described above, in the seat belt retractor 1 of the embodiment, after the locking base 14 is locked, the large EA load consisting of the EA load due to the twist-deformation of the torsion bar 7 and the EA load due to the deformation of the strip 22 is generated, as indicated by solid line shown in FIG. 4. Then, the small EA load consisting of only the EA load due to the twist-deformation of the torsion bar 7 is generated. The EA load due to the deformation of the strip 22 varies according to the deformation of the main portion 22a, the uniformly narrow portion 22d, and the sloping portion 22e. More specifically, just after the locking base 14 is locked, the strip 22 is not pulled out due to slight looseness in fitting of the strip 22, and only the small EA load due to the twist-deformation of the torsion bar 7 is generated. Then, the strip 22 is immediately tightened and is pulled out, so that the EA load due to the deformation of the strip 22 is generated.

In the seat belt retractor 1 of the embodiment, the EA load due to the deformation of the strip 22 is variable according to the width of the strip 22, i.e. the main portion 22a, the uniformly narrow portion 22d, and the sloping portion 22e. Therefore, it is possible to adjust the EA load according to, for example, a type of automobile. More specifically, it is possible to absorb the impact energy on the occupant more effectively and properly according to a type of automobile through the following arrangements in which: the uniformly narrow portion 22d or the sloping portion 22e is used alone; the uniformly narrow portion 22d and the sloping portion 22e are used together; the uniformly narrow portion 22d has a different width and length, and is disposed at a different position; and the sloping portion 22e is disposed at a different position and has a different slope. (When the uniformly narrow portion 22d and the sloping portion 22e are used together, they may be separated or adjoin. The order in which they are provided is optional.)

The guide plate 21 has a simple ring shape, and the strip 22 is formed in a long plate. The strip 22 continuously passes through the guide groove 21d and deforms, thereby obtaining stable effect of absorbing the energy with the simple structure.

The guide plate 21 has a simple ring shape and is fitted in the axial direction. Accordingly, it is easy to fit the guide plate 21 to the locking base 14 and to fit the locking base 14 with the guide plate 21 to the spool 4. Therefore, the energy absorbing mechanism 20 has a simple structure and can be produced at low cost.

Other structures and operations of the embodiment are the same as those of the conventional seat belt retractor 1 shown in FIG. 16. The seat belt retractor 1 of the embodiment may be installed in a seat belt device, so that the seat belt device can absorb the impact energy on the occupant effectively, and can restrain and protect the occupant appropriately in case of emergency.

Instead of the uniformly narrow portion 22d and sloping portion 22e formed in the strip 22, the strip 22 may be provided with a uniformly wide portion having a width larger than that of the main portion 23a, and a sloping portion having a width gradually increasing. With the uniformly narrow portion 22d, sloping portion 22e, uniformly wide portion, and sloping portion having a width gradually increasing, it is possible to generate various EA loads. The strip 22 may be disposed in the locking base 14, and the guide plate 21 may be disposed in the spool 4. In the present invention, instead of the torsion bar 7, a normal drive shaft may be used.

Figure 5A:
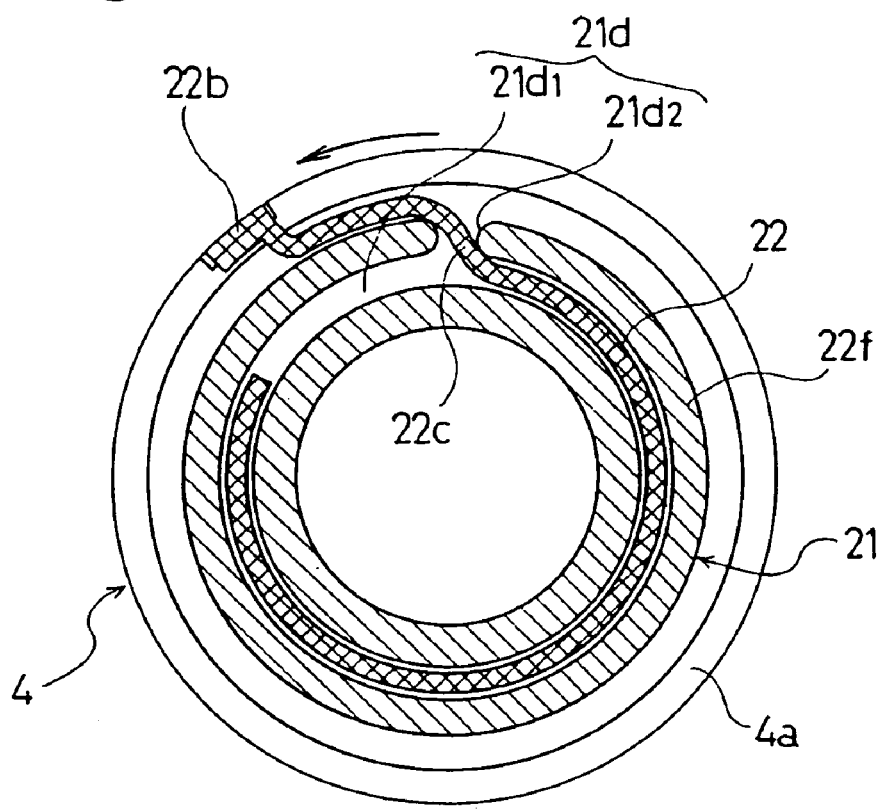
Figure 5B:
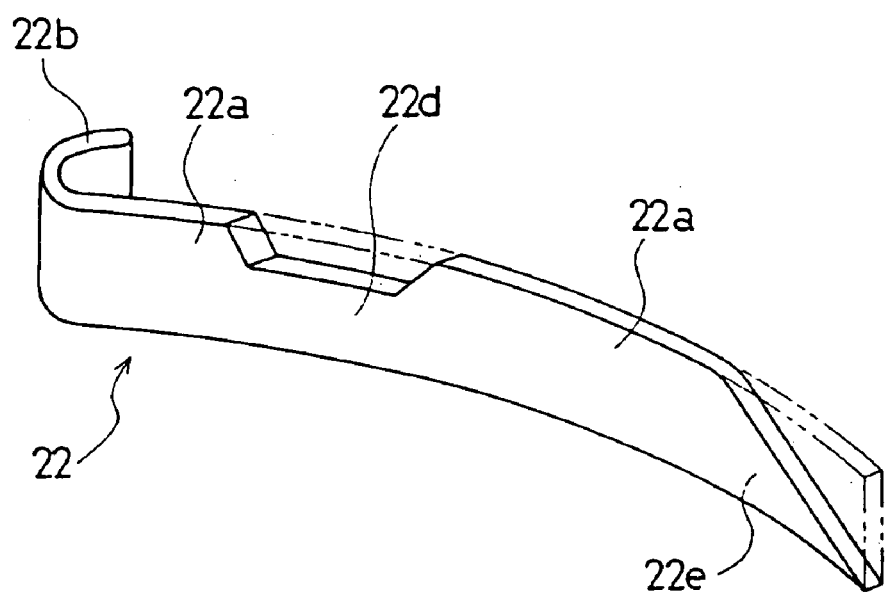

FIGS. 5(a) and 5(b) show another embodiment of the present invention. FIG. 5(a) is a sectional view of a seat belt retractor similar to FIG. 1(b). FIG. 5(b) is a perspective view of a strip according to the embodiment. The same reference numerals designate the elements same as those of the previous embodiment, and the descriptions thereof are omitted.

In the previous embodiment, the guide groove 21d of the guide plate 21 is formed in the arc shape. In the present embodiment, as shown in FIG. 5(a), the guide groove 21d of the guide plate 21 includes a circular groove 21d1 and a radial groove 21d2 formed in an outer circular portion 22f constituting the circular groove 21d1. As shown in FIG. 5(b), the engaging portion 22b of the strip 22 has a U shape viewed from a side (viewed in the axial direction of the spool to which the strip 22 is fitted).

In the seat belt retractor 1 of the embodiment, when the spool 4 rotates relative to the locking base 14 in the direction of unwinding the seat belt in case of emergency, the strip 22 is rubbed to deform at an edge of the outer circular portion 22f forming the circular groove 21d1. Other structures and operations of the embodiment are the same as those of the previous embodiment, and the EA load characteristic shown in FIG. 4 is obtained. Effects of the seat belt retractor of the embodiment are substantially the same as those of the previous embodiment. A seat belt device equipped with the seat belt retractor of the embodiment has the same effects as those of the seat belt device of the previous embodiment.

As described above, in the seat belt retractor according to the embodiments, it is possible to obtain the various EA loads due to the deformation of the energy absorbing member by changing the width of the member, and to adjust the EA load according to, for example, the type of automobile, thereby absorbing the impact energy on the occupant effectively and properly. The energy absorbing member is formed of the strip plate and deforms continuously, thereby obtaining the stable effect of absorbing the energy with the simple structure. The energy absorbing mechanism has a simple strip shape, thereby making it easy to assemble and reducing cost.

Further, it is possible to obtain the large EA load consisting of the EA load due to the twist-deformation of the torsion bar 7 and the EA load due to the deformation of the strip 22, and the small EA load consisting of only the EA load due to the twist-deformation of the torsion bar 7. Therefore, the EA load is flexibly adjustable, thereby absorbing the impact energy on the occupant effectively and appropriately.

The seat belt device is equipped with the seat belt retractor according to the embodiment, thereby absorbing the impact energy on the occupant effectively, and restraining and protecting the occupant appropriately.

Figure 6:
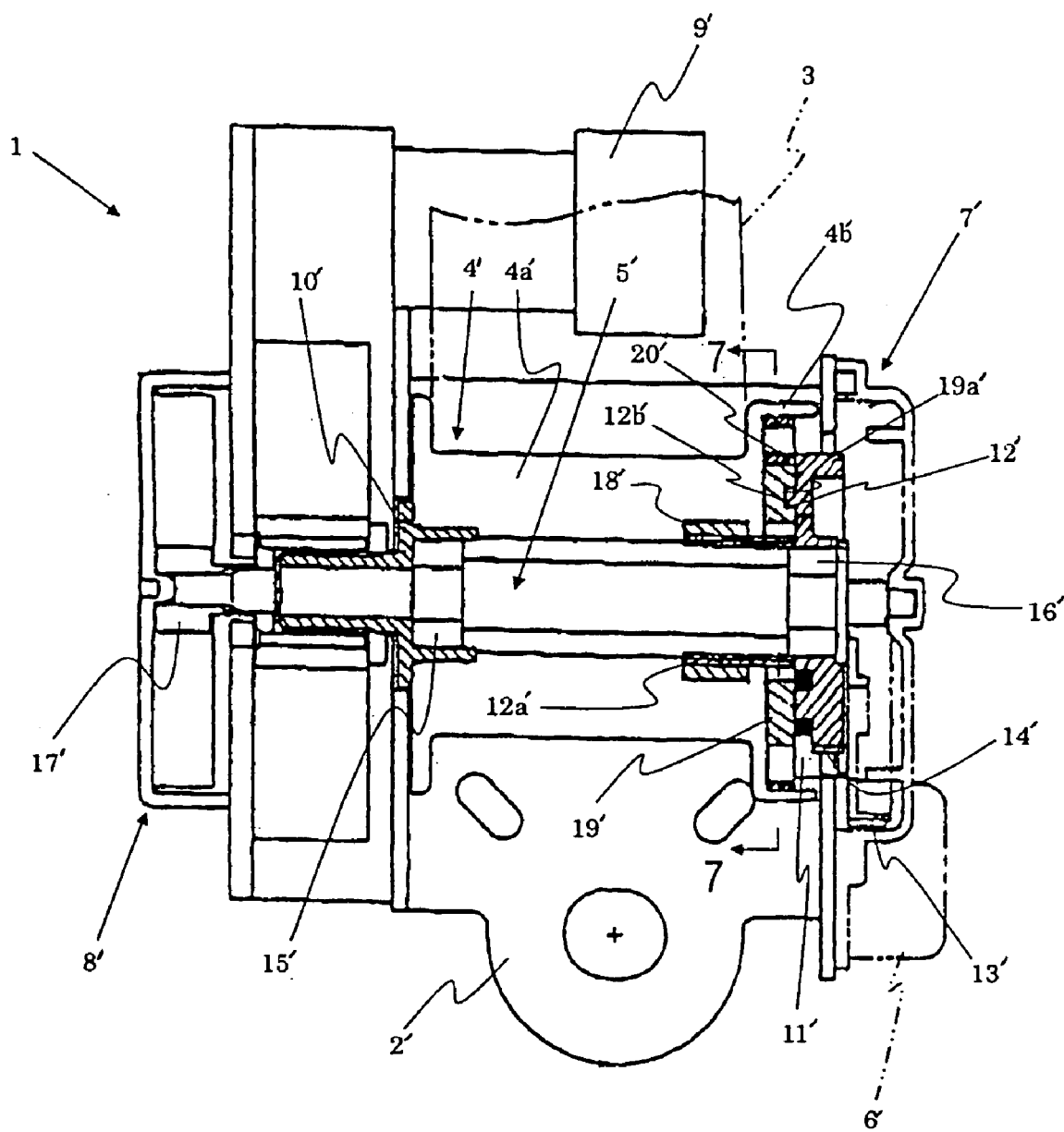
FIG. 6 is a longitudinal sectional view schematically showing an overall structure of a seat belt retractor according to a further embodiment of the present invention.

FIG. 6 is a longitudinal sectional view showing an overall structure of a seat belt retractor according to a further embodiment of the present invention. As shown in FIG. 6, the retractor 1 includes a frame 2; a spool (a cylinder member) 4' for winding a seat belt 3; a torsion bar 5' (a shaft member) formed of a material capable of twisting and deforming; deceleration sensing means 6' for detecting large deceleration of a vehicle in case of emergency to be activated; a locking mechanism 7' for preventing the spool 4' from rotating at least in the direction of unwinding the seat belt 3; spring means 8' including a spiral spring (not shown); a pre-tensioner 9' for generating belt winding torque in case of emergency; and a bush 10' for transmitting the belt winding torque of the pre-tensioner 9' to the spool 4'.

The locking mechanism 7' has a locking base 12' for holding a pawl 11' to be rotatable and a locking gear 13'. The locking gear 13' rotates together with the torsion bar 5' during a normal operation and stops in an emergency by an operation of the deceleration sensing means 6' to make a rotational difference relative to the torsion bar 5', thereby engaging the pawl 11' with the internal teeth 14' in an sidewall of the frame 2. Consequently, the locking base 12' (in other words, the spool 4') is prevented from rotating in the direction of unwinding the seat belt 3. Although detailed illustration is omitted, when the seat belt 3 is withdrawn suddenly, the locking base 12' of the locking mechanism 7' also rotates in the direction of unwinding the seat belt 3 relative to the locking gear 13'. In this way, the seat belt 3 is prevented from being withdrawn as described above.

The torsion bar 5' is inserted into the inside of the spool 4' in an axial direction. The torsion bar 5' has a torque transmitting portion (second torque transmitting portion) 15' located at one end (left in FIG. 6) and engaging the spool 41 not to rotate relative to the spool 4', and a torque transmitting portion (first torque transmitting portion) 16' located at the other end (right in FIG. 6) and engaging the locking base 12' not to rotate relative to the locking base 12' (in other words, supported by the locking base 12' to rotate together with the locking base 12'), and functions as a connector connecting the spool 4' with the locking mechanism 7' rotatably.

The spool 4' has a main cylinder portion 4a' and a thick cylinder portion with a diameter larger than that of the main cylinder portion 4a' supported rotatably between both sidewalls of the frame 2. By the spring force of the spring means 8', the spool 4' is urged constantly in the direction of winding the seat belt 3, via the bush 17', the torsion bar 5', the second torque transmitting portion 15' of the torsion bar 5', and the bush 10'. With such a structure, a first end (left end in FIG. 6) of the torsion bar 5' is connected to the spool 4' to be rotatable together therewith. When the pre-tensioner 9' is in operation, the belt-winding torque produced in the pre-tensioner 9' is transmitted to the spool 4' via the bush 10'. The spool 4' winds the seat belt 3 by a predetermined length.

A ring-shaped relative rotation locking member 18' is disposed between the spool 4' and the shaft portion 12a' of the locking base 12'. The relative rotation locking member 18' has a female thread (not shown) on the inner peripheral surface thereof. The shaft portion 12a' of the locking base 12' has a male thread (not shown). The relative rotation locking member 18' is screwed in the shaft portion 12a' of the locking base 12', and fitted into the axial hole of the spool 4' so as not to rotate relatively and move axially. When the spool 4' rotates relative to the locking base 12' in the direction of unwinding the seat belt 3, the relative rotation locking member 18' rotates together with the spool 4' and moves to the right in FIG. 6.

As a feature of the embodiment, a ring 19' (plate fitting member) and a plate member 20' capable of deforming plastically are disposed inside of the spool 4' at the right end in FIG. 6. The ring 19' has a substantial disk shape, and the torsion bar 5' is inserted into the center of the ring 19'. An engaging projection 12b' formed in the locking base 12' at the left side in FIG. 6 is fitted into an engaging recess 19a' formed in the ring 19' at the right side in FIG. 6. In this way, the ring 19' is connected to the locking base 12' so as to rotate together with the torsion bar 5' via the locking base 12'.

Figure 7:
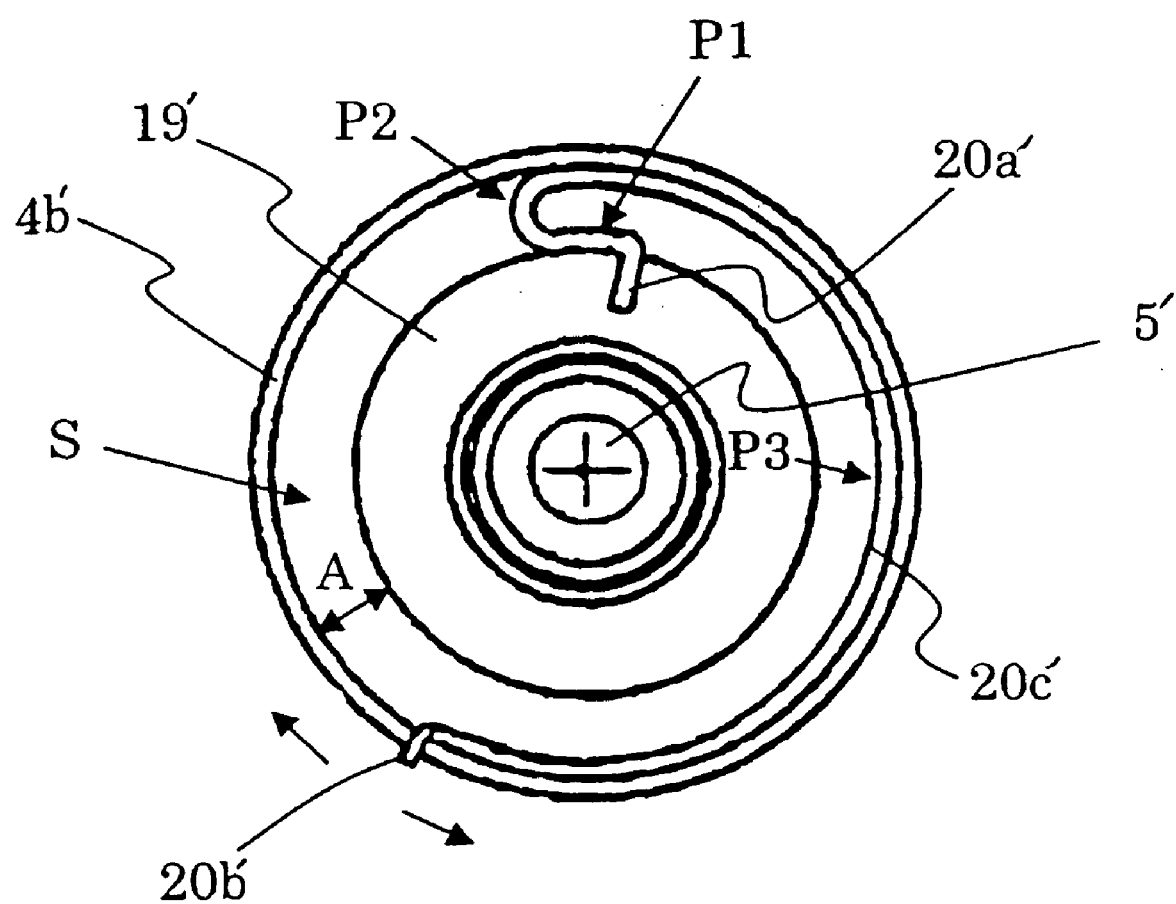
FIG. 7 is a sectional view of a detailed structure of a plate member taken along line 7—7 in FIG. 6, wherein sectional lines are omitted.
Figure 8:
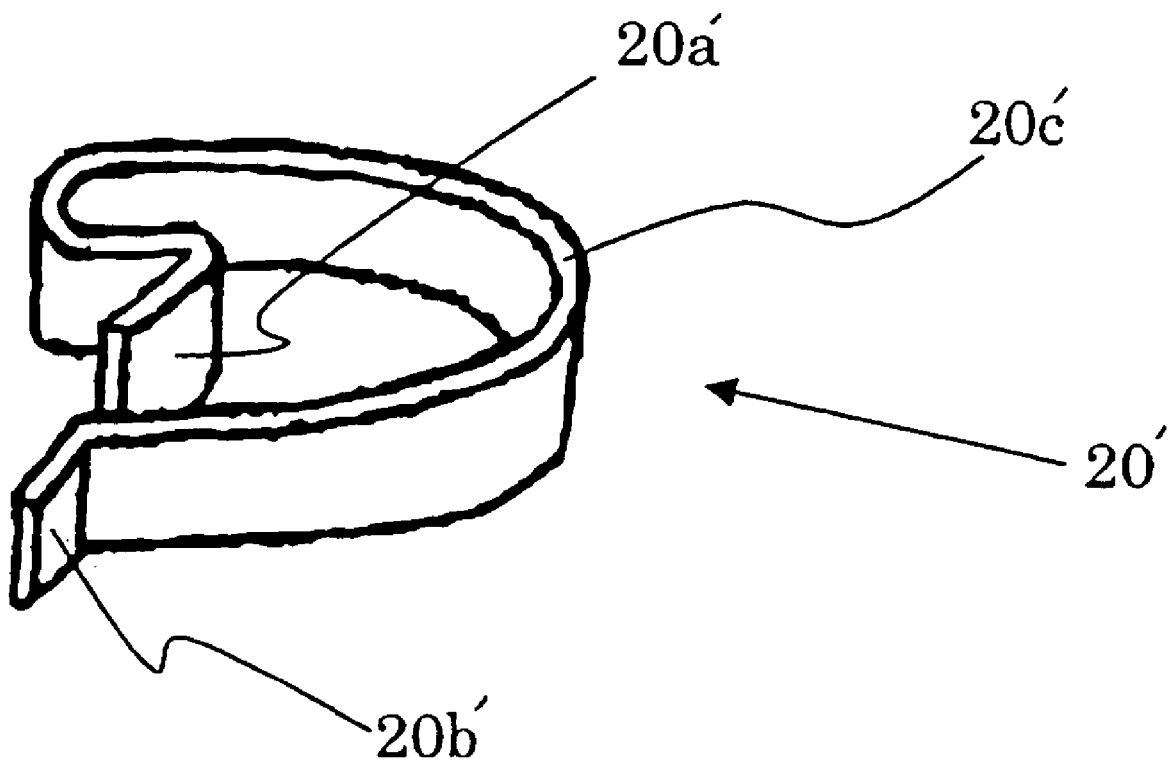
FIG. 8 is a perspective view showing a plate member shown in FIG. 7 in an assembled state.

FIG. 7 is a cross-sectional view taken along line 7—7 in FIG. 6 showing a detailed fitting structure of the plate member 20'. FIG. 8 is a perspective view showing the plate member 20' shown in FIG. 7. In connection with the plate member 20 shown in FIGS. 7 and 8, a first end 20a' (end close to the center of the ring 19' and the spool 4') is fixed to the periphery of the ring 19'. On the other hand, a second end 20b' (end away from the center of the ring 19' and the spool 4') engages the internal periphery of the thick cylinder portion 4b' of the spool 4'. More specifically, the second end 20b' penetrates into the thick cylinder portion 4b' from inside to outside. The second end 20b' can be disengaged from the thick cylinder portion 4b' (described below). A middle portion 20c' is located between the first end 20a' and the second end 20b'.

In the initial state (before the energy absorption state described below), the middle portion 20c' extends around the external periphery of the ring 19' in the direction of unwinding the seat belt 3 (counterclockwise in FIG. 7) to form an external extending segment (P1 in FIG. 8). Then, the middle portion 20c' makes a U-turn to form a U-turn segment (P2 in FIG. 8) in a ring space S formed between the ring 19' and the thick cylinder portion 4b' and having a radial thickness A. After making a U-tern, the middle portion 20c' extends along the internal periphery of the thick cylinder portion 4b' in the direction of winding the seat belt 3 (clockwise in FIG. 7) to form an internal extending segment (P3 in FIG. 8). In the embodiment, the second end 20b' connected to the middle portion 20c' is located at the substantially opposite side of the center (apart 180 degrees) from the first end 20a'.

An operation of the retractor 1 of the embodiment will be explained next. In a normal operation, when the seat belt 3 is not used, the seat belt 3 is retracted completely by the urging force of the spring means 8'. When the seat belt 3 is withdrawn in a normal speed for wearing, the spool 4' rotates in the direction of unwinding the seat belt 3, and the seat belt 3 is withdrawn smoothly. After a tongue (not shown) slidably fitted to the seat belt 3 is inserted into and engages a buckle unit (not shown) fixed to the auto body, a portion of the seat belt 3 withdrawn to excess is wound around the spool 4' by the urging force of the spring means 8'. In this way, the seat belt 3 is fitted to the occupant without inflicting a feeling of pressure.

In an emergency state, the seat belt winding torque produced by the pre-tensioner 9' is transmitted to the spool 4'. The spool 4' winds the seat belt 3 to a predetermined length to restrain the occupant quickly. The deceleration sensing means 6' is activated by the large deceleration occurring in the emergency for preventing the locking gear 13' from rotating in the direction of unwinding the seat belt 3. Then, the pawl 11' of the locking mechanism 7' is turned to engage the internal teeth 14' of the frame 2. Since the locking base 12' and the torsion bar 5' are prevented from rotating in the direction of unwinding the seat belt, tension of the seat belt 3 restraining the occupant moving forward due to inertia acts as rotational force of the spool 4' relative to the torsion bar 5' in the direction of unwinding the seat belt. Accordingly, the torsion bar 5' is twisted, and the spool 4' alone rotates in the direction of unwinding the seat belt relatively.

When the spool 4' rotates relative to the torsion bar 5' by a fixed angle or more, the torsion bar 5' deforms plastically by the twist force due to the relative rotation, and collision energy is absorbed by the plastic deformation. With this movement, the plate member 20' provided between the ring 19' rotating together with the locking base 12' and the spool 4' rotating relative to the ring 19' deforms plastically, and is wound around, for example, the ring 19' in the direction of unwinding the seat belt 3, thereby further absorbing the collision energy through the plastic deformation.

Figure 9:
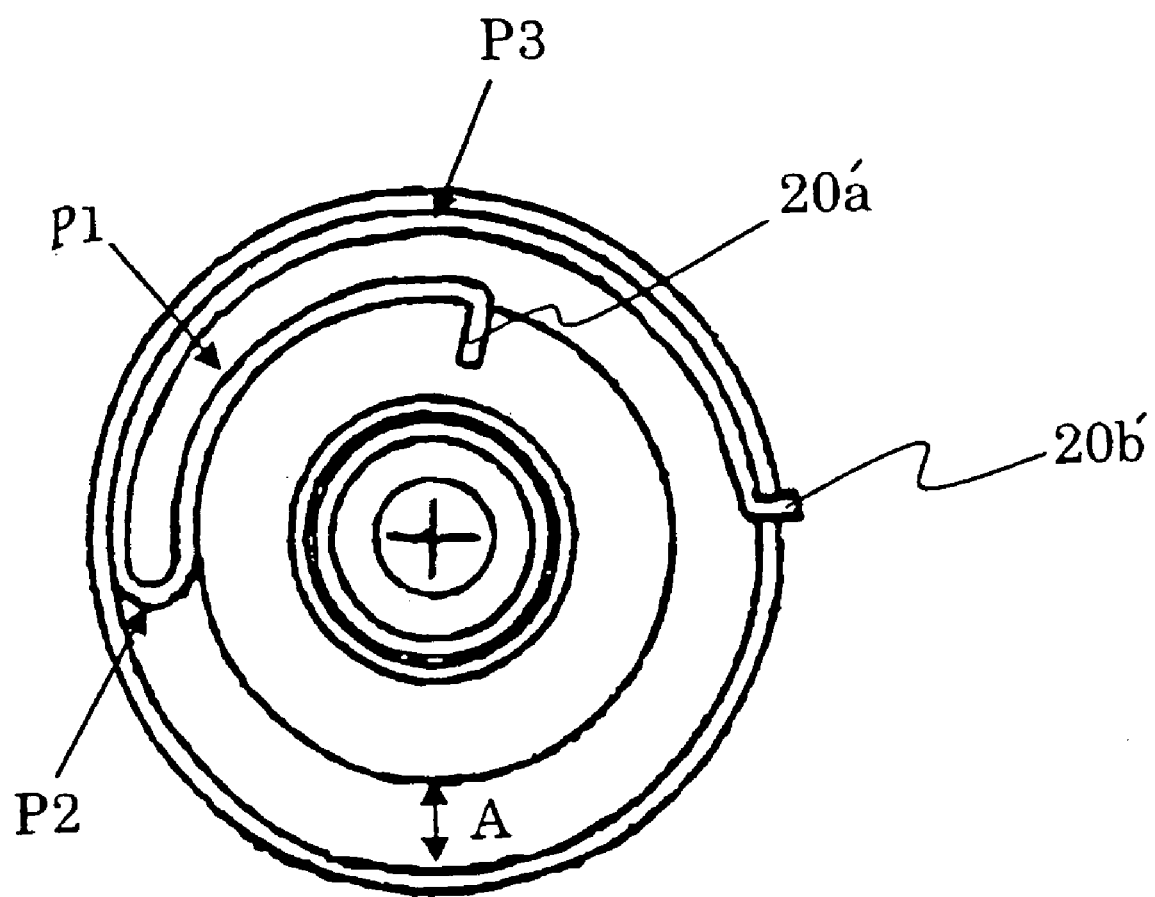
FIG. 9 is a view showing the plate member deforming plastically for absorbing impact energy when a spool rotates relative to a torsion bar.

FIG. 9 shows a view showing the plate member 20' deforming plastically for absorbing impact energy when the spool 4' rotates relative to the torsion bar 5' (not shown). As shown in FIG. 9, with the progress of twining of the plate member 20' by the rotation (counterclockwise in FIG. 9) of the spool 4' relative to the torsion bar 5', the external extending segment (P1) extends, and the U-turn segment (P2) is displaced in the direction of unwinding the seat belt 3. In other words, the segment where the largest deformation is performed is sequentially displaced in the direction of unwinding the seat belt 3. Accordingly, the internal extending segment (P3) shortens, and an angle between the first end 20a' and the second end 20b' decreases.

Figure 10:
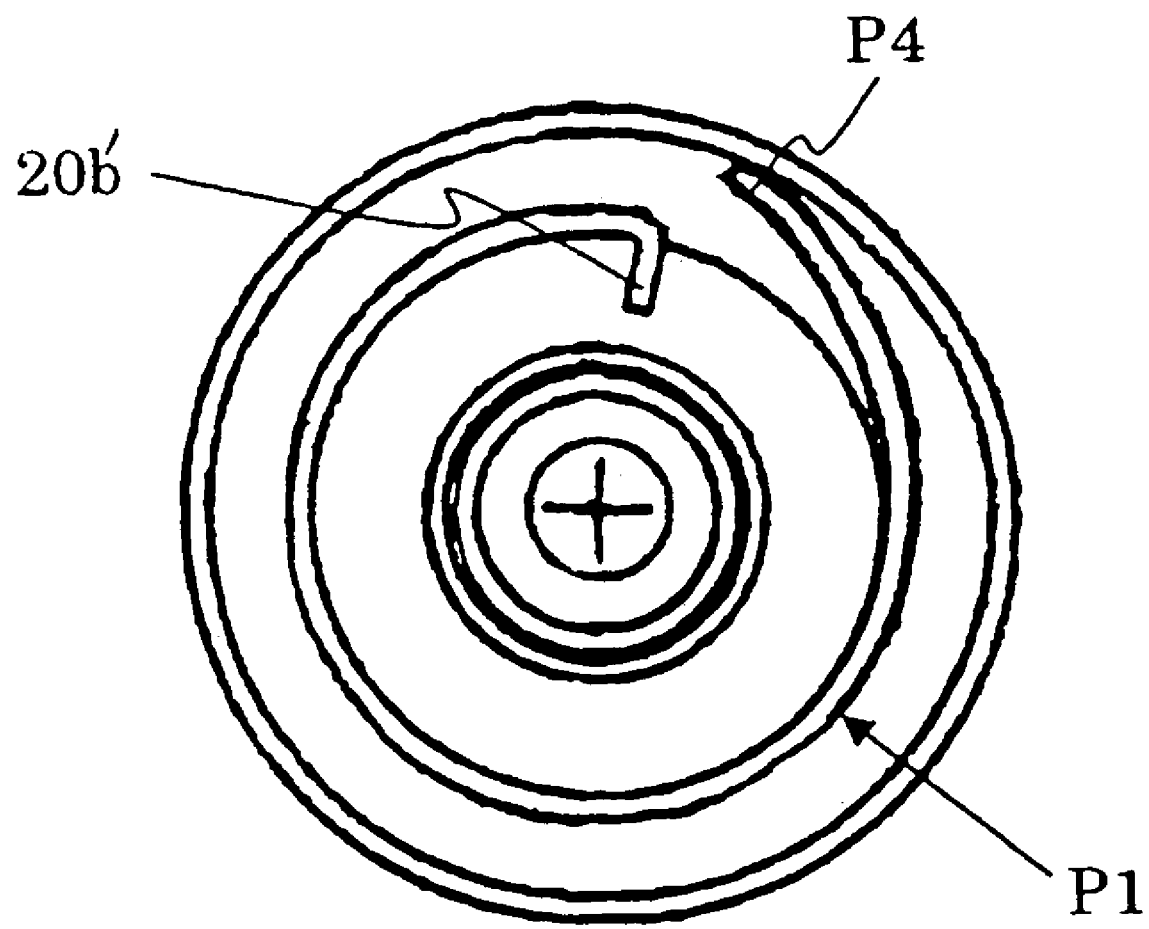
FIG. 10 is a view showing the plate member separating from the spool when the spool further rotates relative to the torsion bar.

FIG. 10 shows the further progress of the relative rotation (the torsion bar 5' is not shown). As shown in FIG. 10, with the progress of twining of the plate member 20' by the rotation (counterclockwise in FIG. 9) of the spool 4' relative to the torsion bar 5', the external extending segment (P1) extends further. At last, the second end 20b' is disengaged from the thick cylinder portion 4b' and functions as a free end (P4). The U-turn segment (P2) and the internal extending segment (P3) disappear.

As described above, in the embodiment, when the spool 4' rotates relative to the torsion bar 5' in the direction of unwinding the seat belt 3 and twists the torsion bar 5', plastic deformation of both the torsion bar 5' and the plate member 20' functions as an energy absorption mechanism (EA mechanism). The entire EA load is a sum of the EA load when the torsion bar 5' twists and deforms and the EA load when the plate member 20' twines around the plate fitting member. By twist torque when the torsion bar 5' deforms plastically and by plastic deformation of the plate member 20', the impact energy applied to the occupant is absorbed and eased, and the load applied to the seat belt 3 is restricted.

Figure 11:
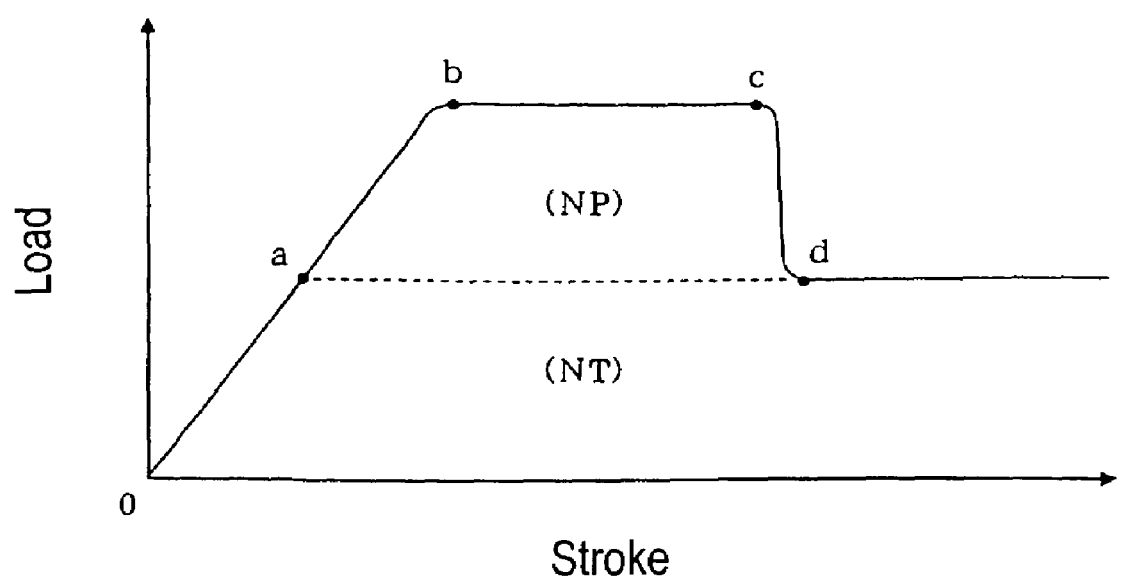
FIG. 11 is a graph showing a characteristic of the EA load when the EA mechanism composed of the torsion bar and the plate member absorbs the impact energy.

FIG. 11 is a graph showing a variation of the counter load (hereinafter referred to as EA load) generated in the EA mechanism composed of the torsion bar 5' and the plate member 20' when the impact energy is absorbed as described above. The horizontal axis shows a rotational stroke (angle) of the spool 4' relative to the locking base 12'.

As shown in FIG. 11, the EA load is zero when the rotational stroke of the spool 4' relative to the locking base 12' is zero. Then, when the relative rotation described above starts and the stroke starts to increase, as described above, the EA load by the twist of the torsion bar 5' first increases proportionally. When the stroke increases up to a value (point a in FIG. 11), as described above, the plastic deformation of the plate member starts in addition to the twist of the torsion bar 5'. The entire EA load is the sum of the EA load by the torsion bar 5' (shown as NT in FIG. 11) and the EA load by the plate member 20' (shown as NP in FIG. 11). When the stroke increases further, the sum of the EA loads of the entire retractor 1 stops increasing at a fixed value (point b in FIG. 11). After that, despite increase of the stroke, the EA load is maintained at the fixed value (point b to point c in FIG. 11). The state shown in FIG. 9 corresponds to this state.

When the stroke increases further and the second end 20b' is disengaged from the thick cylinder portion 4b' (see FIG. 10), the EA load of the entire retractor 1 drops sharply (point c to point d in FIG. 11) because the EA load is no longer generated by the plate member 20' and generated by the torsion bar 5' alone (NT). After that, despite increase of the stroke, the EA load maintains the dropped value (right side from point d in FIG. 11).

In this embodiment, the stroke is limited by the relative rotation locking member 18'. That is to say, with the rotation of the spool 4' relative to the locking base 12' in the direction of unwinding the seat belt 3, the relative rotation locking member 18' moves to the right in FIG. 11. When the relative rotation locking member 18' reaches the end of the male thread, it is prevented from moving further to the right. Therefore, the rotation is locked. The relative rotation locking member 18' stops rotating relative to the locking base 12'. That is to say, the spool 4' is prevented from rotating in the direction of unwinding the seat belt 3, the seat belt 3 is not withdrawn, and the occupant does not move due to inertia to be protected.

This embodiment has the following advantages. In this embodiment, the energy absorption characteristics of the entire retractor 1 are easily optimized. Therefore, it is possible to meets the recent needs, to easily optimize the energy absorption characteristics according to a difference in a structure of a vehicle, and to protect the occupant sufficiently. This advantage will be described in detail with reference to FIGS. 12 to 14.

As described above, in the retractor 1 of this embodiment, when the spool 4' rotates relative to the torsion bar 5' in the direction of unwinding the seat belt 3 and twists the torsion bar 5', the entire energy absorption load is the sum of the energy absorption load when the torsion bar 5' deforms plastically and the energy absorption load when the plate member 20' twines around the plate fitting member. At this time, the energy absorption load and the energy absorption period concerning the torsion bar 5' can be optimized by selecting a material and thickness of the torsion bar 5'. Further, the energy absorption load and energy absorption period concerning the plate member 20' can be optimized easier. The technique for that will be described as follows.

In the conventional retractor, the EA plate is directly fitted to the middle of the shaft and disposed in a limited narrow space between the shaft and spool. Therefore, it is difficult to increase the radial thickness of the ring space between the shaft and the spool. On the contrary, in the retractor 1 of this embodiment, the first end 20a' of the plate member 20' is fixed not to the torsion bar 5' but to the periphery of the ring 19' provided at one end of the torsion bar 5', and the second end 20b' of the plate member 20' engages not the middle of the spool 4' but the thick cylinder portion 4b' at one end of the spool 4'. Therefore, the radial thickness A of the ring space S is optimized by setting the diameter of the ring 19' independently of the diameter of the torsion bar 5'. (Needless to say, the internal diameter of the thick cylinder portion 4b' of the spool 4' may be increased or decreased.) For example, if the radial thickness A of the ring space S is increased (or decreased), the curvature radius of the U-turn segment (P2) is increased (or decreased). Therefore, it is easy to increase (or decrease) the EA load.

Figure 12:
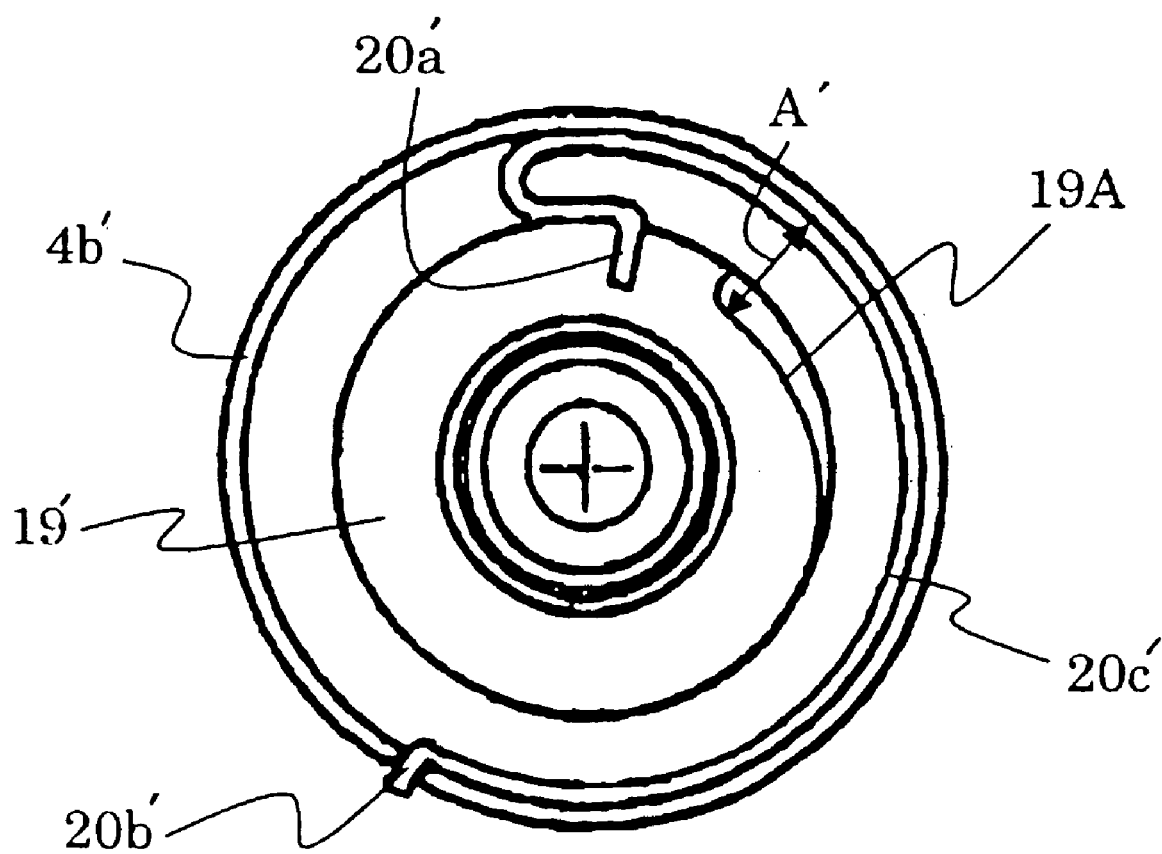
FIG. 12 is a view showing an example of a radial thickness A of a ring space between a thick cylinder portion of the spool and a ring.

FIG. 12 shows an example of setting the radial thickness A of the ring space S corresponding to FIG. 8. The same reference characters designate the same components as those in FIG. 8, so that the descriptions thereof are omitted. As shown in FIG. 12, the ring 19' has a thin portion 19A' having a radius smaller than that of the other portion thereof to form a recess. The thin portion 19A' may be provided entirely in the axial direction. When the plate member 20' twines around the thin portion 19A', the distance between the plate member 20' and the thick cylinder portion 4b' increases, thereby decreasing the energy absorption load.

Figure 13:
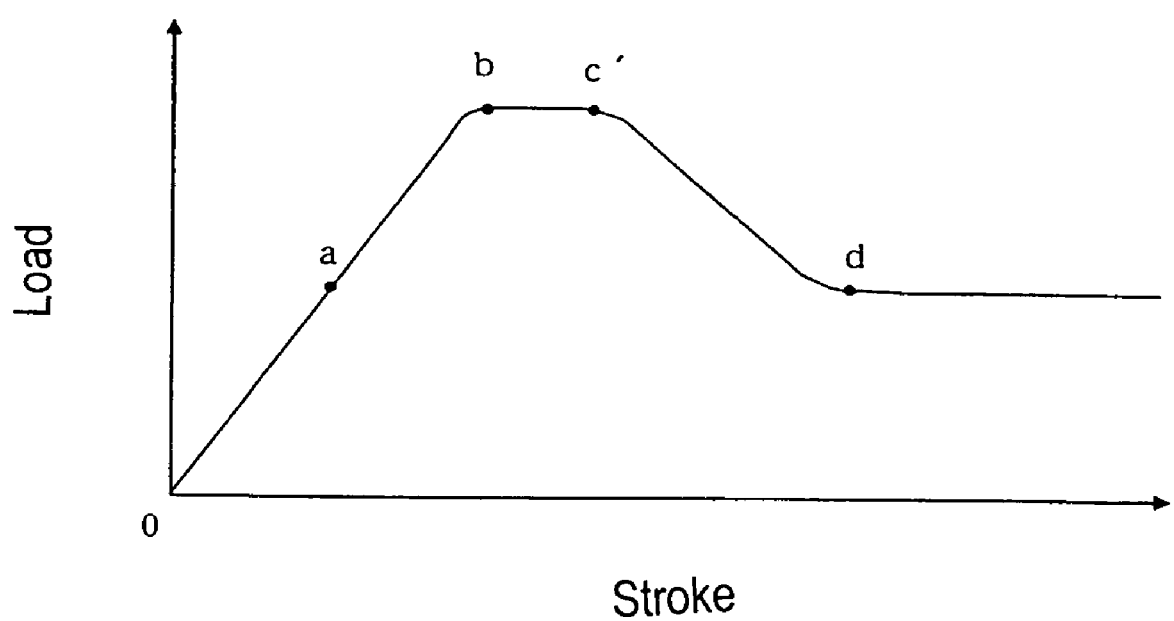
FIG. 13 is a graph showing a characteristic of the EA load when the EA mechanism composed of the torsion bar and the plate member shown in FIG. 7 absorbs the impact energy.

FIG. 13 is a graph showing a variation of the EA load in this case corresponding to FIG. 11. The same reference characters designate the same portions as those in FIG. 6, and the descriptions thereof are omitted. As shown in FIG. 13, before the plate member 20' twines around the thin portion 19A', the EA load is the same as in FIG. 11 (origin to point c' through point a and point b). According to increase of the stroke, the plate member 20' enters the thin portion 19A' (point c') and twines around the thin portion 19A'. As the stroke increases and the plate member 20' twines around the thin portion 19A', the distance (A' in FIG. 12) between the plate member 20' and the thick cylinder portion 4b' increases gradually. Accordingly, the curvature radius of the U-turn segment (P2) increases gradually. In this way, the EA load decreases gradually (right side from point c' in FIG. 13). Finally, the second end 20b' is disengaged from the thick cylinder portion 4b' (point d).

In the conventional structure, since the ring space is limited, it is difficult to increase the thickness of the EA plate. If a thick plate is used in the limited space, twining by plastic deformation is difficult. On the contrary, in the retractor 1 of this embodiment, the radial thickness A of the ring space S can be determined freely as described above. Therefore, it is easy to increase the EA load by increasing the thickness of the plate member 20' to enhance the rigidity. It is also easy to decrease the EA load by decreasing the thickness to reduce the rigidity.

Figure 14:
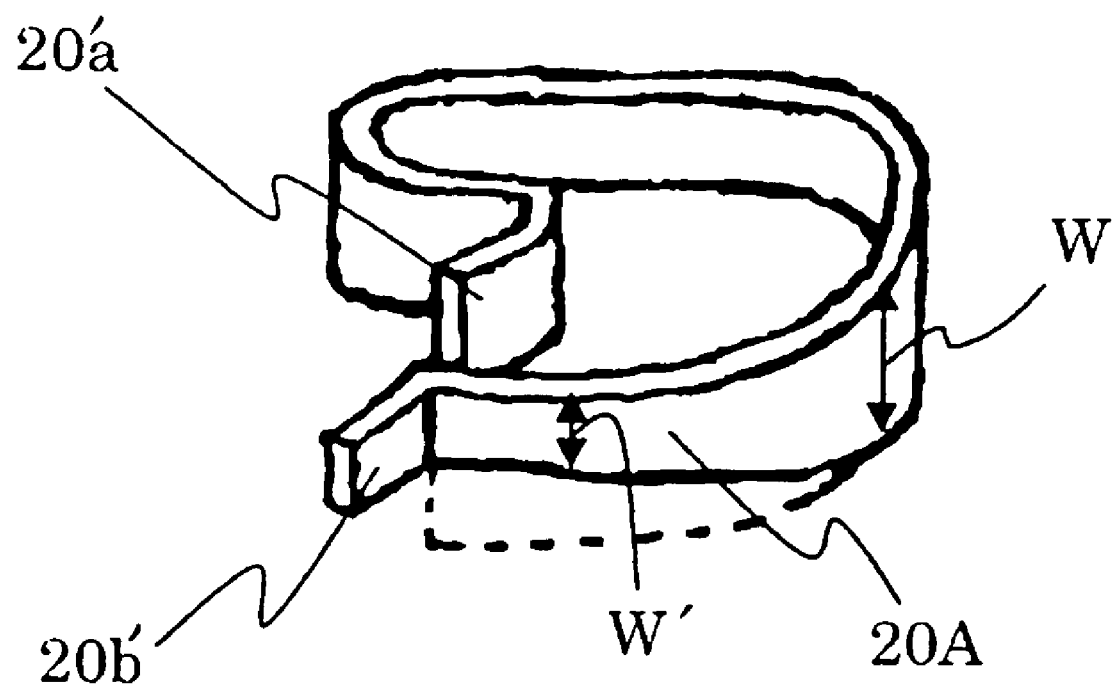
FIG. 14 shows an example of the plate member having various widths.

As a technique similar to the rigidity control by setting the plate thickness, the width of the plate member 20' may be varied. FIG. 14 shows a plate member 20' having a varied width W. In this example, the plate member 20' has a narrow portion 20A' in the vicinity of the second end 20b'. The width W' of the narrow portion 20' is smaller than the width W of the other portion. (Accordingly, the width of the second end 20b' is also smaller.) In the narrow portion 20A', strength of the plate member 20' is smaller than that of the other portion. Therefore, when the plate member 20' deforms from the first end sequentially and deforms around the ring 19' as shown in FIG. 14, and the narrow portion 20A' deforms plastically in the late stage, the load necessary for the plastic deformation decreases. In this way, the energy absorption load decreases.

As shown in FIG. 14, especially in this example, the width W' of the narrow portion 20A' decreases gradually toward the second end 20b'. Therefore, the EA load characteristic is the same as in FIG. 13. (In this case, point c' to point d in FIG. 13 corresponds to the narrow portion 20A'.)

In the conventional structure, the engaging position of the EA plate with the spool is in the middle portion in the axial direction. However, the middle portion of the spool is for winding the webbing and provided with a webbing-fixing structure. Therefore, the engaging position of the EA plate with the spool in the circumferential direction is limited by the webbing-fixing structure and can not be modified freely.

On the contrary, in the retractor 1 of this embodiment, the engaging position of the plate member 20' with the spool 4' is in the thick cylinder portion 4b' at the end of the spool 4'. Therefore, the engaging position of the plate member 20' with the spool 4' in the circumferential direction is not limited by the webbing-fixing structure and can be determined freely. Therefore, it is possible to reduce the energy absorption period (the horizontal axis) shown in FIGS. 11 and 13 by moving the engaging position of the second end 20b' of the plate member 20' counterclockwise in FIG. 12 to decrease the stroke when the second end 20b' of the plate member 20' twines around the ring 19'. It is also possible to extend the energy absorption period by moving the engaging position of the plate member 20' clockwise in FIG. 12 to increase the stroke when the plate member 20' twines around the ring 19'. In this way, the EA load characteristic can be optimized.

As described above, the EA load and energy absorption period of the retractor 1 of this embodiment are easily optimized. By combining with sharing of the energy absorption between the torsion bar 5' and the plate member 20', the energy absorption characteristic of the entire retractor 1 is easily optimized. Therefore, it is possible to meet the recent needs, to optimize the energy absorption characteristics easily according to difference in structure of vehicles, and to protect the occupant sufficiently. Needless to say, in addition to the techniques described above, determining an appropriate material of the plate member 20' makes it possible to optimize the energy absorption characteristics more flexibly.

In the retractor 1 of this embodiment, as described above with reference to FIG. 10, the second end 20b' of the plate member 20' is disengaged from the thick cylinder portion 4b' in the late stage of collision, so that the collision energy absorption with the plate member 20' stops. Therefore, after that, it is possible to make the torsion bar 5' alone absorb the energy as shown in FIG. 11. Consequently, in addition to the effect described above, the collision energy absorption load and energy absorption period of the entire retractor 1 can be determined more freely and optimized flexibly.

Figure 15:
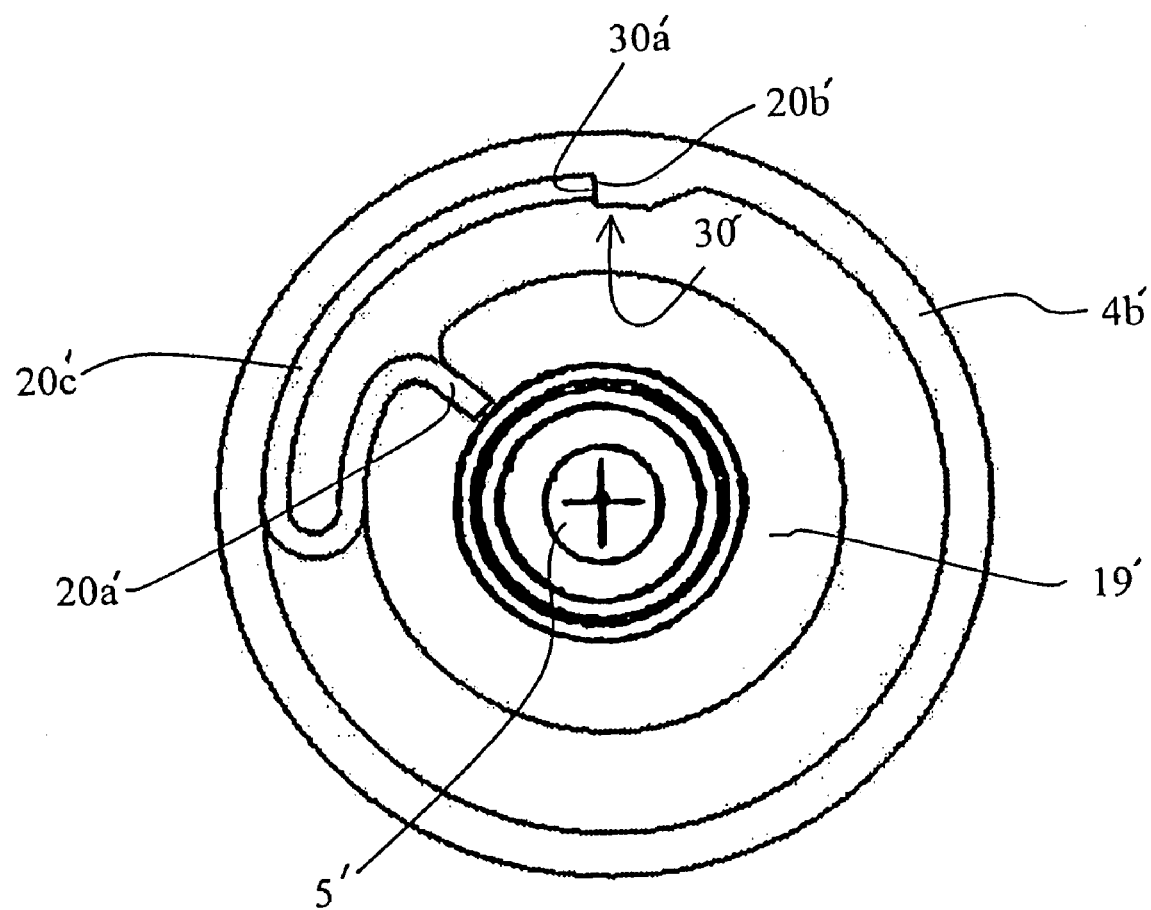
FIG. 15 is a view showing a modification of an engaging structure of the plate member.

From this perspective, as shown in FIG. 15, the thick cylinder portion 4b' of the spool 4' may be provided with a projection 30' projecting from the inner surface, and the second end 20b' of the plate member 20' may be in contact with the projection 30'. In the example of FIG. 15, the second end 20b' of the plate member 20' is not L-shape as in the above-mentioned examples but straight. The projection 30' has an end face 30a' with which the second end 20b' is in contact on one side in the circumferential direction (left side in FIG. 15, i.e. a side in the direction of rotation of the spool 4' relative to the torsion bar 5'). When the relative rotation starts, the second end 20b' is biased by the surface 30a' in the direction of the relative rotation, and the plate member 20' is deformed and wound around the ring 19' in the direction of unwinding the seat belt 3 as described with reference to FIG. 9. According to further progress of the relative rotation, the second end 20b' is separated from the surface 30a' to be separated from the thick cylinder portion 4b'.

With such a structure, it is possible to separate the plate member 20' from the thick cylinder portion 4b more smoothly and enables the plate member 20' to stop absorbing the collision energy as compared with the case shown in FIG. 7, in which the second end 20b' of the plate member 20' has an L-shape and penetrates into the thick cylinder portion 4b' from inside to outside.

Decreasing the energy absorption load at the last stage as described above has the following advantages. The recent vehicles are equipped with an SRS (Supplemental Restraint System) airbag system, which is inflated in an emergency, cushions the occupant, and thus protects the occupant's body. The airbag system and the seat belt device cooperate to improve the safety of the occupant. When such an SRS airbag system is equipped, role is shared between the airbag system and the seat belt device to maximize the effects of the airbag system safely. In early stages of the collision, that is to say, until the occupant comes into contact with the inflated airbag, the seat belt device ensures a large energy absorption load to minimize the displacement of the occupant. In late stages of the collision, that is to say, after the airbag starts to cushion the occupant, the seat belt device decreases the energy absorption load and only the airbag system protects the occupant.

In this embodiment, the energy absorption load in the late stages of collision is increased. Therefore, it is suitable for role sharing with the SRS airbag system and can prevent the seat belt from applying excessive restraining force to the occupant in the late stages of collision.

In this embodiment, the thick cylinder portion 4b' is formed at one end of the spool 4', and the ring space S for disposing the plate member 20' is formed between the inner surface of the thick cylinder portion 4b' and the periphery of the ring 19'. Therefore, it is possible to reduce the diameter of the entire spool 4' to accommodate the ring 19' and the plate member 20', and the retractor 1 is made compact.

While the invention has been explained with reference to the specific embodiments of the invention, the explanation is illustrative and the invention is limited only by the appended claims.

What is claimed is:

1. A seat belt retractor for winding and unwinding a seat belt, comprising:
   a cylinder member capable of rotating for winding and unwinding the seat belt,
   a shaft member disposed inside the cylinder member and having one end connected to the cylinder member to be rotatable therewith,
   a plate fitting member disposed inside the cylinder member at an end portion thereof and connected to the other end of the shaft member to be rotatable therewith,
   a locking mechanism disposed adjacent to the plate fitting member for locking the same, and
   a plate member capable of deforming plastically and having one end attached to the plate fitting member and the other end engaging the cylinder member, the other end which engages the cylinder member initially approaching said one end in an emergency situation while deforming the plate member to absorb rotation of the cylinder member.

2. A seat belt retractor according to claim 1, wherein said plate member is arranged to change orientation thereof in a direction opposite to an initial direction by deformation thereof.

3. A seat belt retractor according to claim 1, wherein said plate member has a portion partly overlapping each other between said one end and the other end in a condition that the plate member is assembled initially.

4. A seat belt retractor according to claim 3, wherein said plate member has a turning portion near the one end to form the portion partly overlapping each other.

5. A seat belt retractor according to claim 1, wherein said shaft member is made deformable inside the cylinder member, and said plate member deforms plastically when the cylinder member rotates relative to the shaft member.

6. A seat belt retractor according to claim 1, wherein said cylinder member has a main cylinder portion for winding the seat belt, and a thick cylinder portion formed at said other end and having an external diameter larger than that of the main cylinder portion, said plate fitting member having a substantially disk shape, and said plate member being connected to an outside of the plate fitting member in the disk shape at the one end and having the other end engaging an inner surface of the thick cylinder portion.

7. A seat belt retractor according to claim 6, wherein said plate member is arranged such that the other end thereof engaging the inner surface of the thick cylinder portion is disengaged from the thick cylinder portion at a predetermined time after the cylinder member rotates relative to the plate fitting member.

8. A seat belt retractor according to claim 6, wherein said plate fitting member includes a thin portion having a radius smaller than that of other portions thereof so that a distance between the plate member and the thick cylinder portion increases when the plate member is wound around the thin portion.

9. A seat belt retractor according to claim 6, wherein said plate member has a narrow portion at a side of the other end having a width smaller than that of other portions.

10. A seat belt device comprising the seat belt retractor according to claim 1, the seat belt disposed in the seat belt retractor and having an end connected to an auto body, a buckle fixed to the auto body, and a tongue slidably fitted to the seat belt and capable of engaging the buckle.

11. A seat belt retractor for winding and unwinding a seat belt, comprising:
    a cylinder member capable of rotating for winding and unwinding the seat belt,
    a shaft member disposed inside the cylinder member and having one end connected to the cylinder member to be rotatable therewith,
    a plate fitting member disposed inside the cylinder member at an end portion thereof and connected to the other end of the shaft member to be rotatable therewith,
    a locking mechanism disposed adjacent to the plate fitting member for locking the same, and
    a plate member capable of deforming plastically and having one end attached to the plate fitting member and the other end engaging the cylinder member,
    wherein said cylinder member has a main cylinder portion for winding the seat belt, and a thick cylinder portion formed at said other end and having an external diameter larger than that of the main cylinder portion, said plate fitting member having a substantially disk shape, and said plate member being connected to an outside of the plate fitting member in the disk shape at the one end and having the other end engaging an inner surface of the thick cylinder portion,
    wherein said plate member is arranged such that the other end thereof engaging the inner surface of the thick cylinder portion is disengaged from the thick cylinder portion at a predetermined time after the cylinder member rotates relative to the plate fitting member, and
    wherein said thick cylinder portion of the cylinder member has a projection projecting radially inwardly, and said plate member has the other end abutting against the projection.

12. A seat belt retractor according to claim 11, wherein said projection has a contact end surface at one side thereof in a direction that the cylinder member rotates relative to the plate fitting member for abutting against the other end of the plate member so that the plate member is urged in the direction that the cylinder member rotates relative to the plate fitting member until a predetermined time after the cylinder member starts to rotate relative to the plate fitting member, and the other end separates from the contact end surface after the predetermined time.

13. A seat belt device comprising the seat belt retractor according to claim 11, the seat belt disposed in the seat belt retractor and having an end connected to an auto body, a buckle fixed to the auto body, and a tongue slidably fitted to the seat belt and capable of engaging the buckle.

14. A seat belt retractor according to claim 11, wherein said projection has a contact end surface at one side thereof in a circumferential direction for abutting against the other end of the plate member.

* * * * *